United States Patent
Grosman et al.

(10) Patent No.: US 10,042,035 B2
(45) Date of Patent: Aug. 7, 2018

(54) SYSTEM AND METHOD FOR TILE-BASED REDUCTION OF ACCESS POINT LOCATION INFORMATION

(75) Inventors: Yefim Grosman, Sunnyvale, CA (US); Robert W. Mayor, Half Moon Bay, CA (US); Ronald K. Huang, San Jose, CA (US); Andrew Konstantinov, Mountain View, CA (US)

(73) Assignee: Apple, Inc., Cupertino, CA (US)

( * ) Notice: Subject to any disclaimer, the term of this patent is extended or adjusted under 35 U.S.C. 154(b) by 206 days.

(21) Appl. No.: 13/609,830

(22) Filed: Sep. 11, 2012

(65) Prior Publication Data

US 2013/0331113 A1    Dec. 12, 2013

Related U.S. Application Data

(60) Provisional application No. 61/657,545, filed on Jun. 8, 2012.

(51) Int. Cl.
| | | |
|---|---|---|
| *G01S 5/02* | (2010.01) | |
| *H04W 24/02* | (2009.01) | |
| *H04W 24/10* | (2009.01) | |

(52) U.S. Cl.
CPC ........... *G01S 5/0242* (2013.01); *H04W 24/02* (2013.01); *H04W 24/10* (2013.01)

(58) Field of Classification Search
CPC ........ G01C 21/32; G01C 21/36; G01C 21/30; G01C 21/3446; G01S 5/0205; G01S 5/0242; H04W 64/00; H04W 64/003; H04W 88/08; H04W 24/02; H04W 24/10; H04W 24/64; H04W 4/02; H04W 4/021; H04W 4/029

USPC ............... 455/456.1, 456.2, 456.3, 456.6
See application file for complete search history.

(56) References Cited

U.S. PATENT DOCUMENTS

| | | | |
|---|---|---|---|
| 7,406,116 B2 | 7/2008 | Agrawala et al. | |
| 7,466,986 B2 | 12/2008 | Halcrow et al. | |
| 2006/0004515 A1* | 1/2006 | McDonough | G01C 21/32 701/461 |
| 2007/0096945 A1* | 5/2007 | Rasmussen et al. | 340/995.1 |

(Continued)

FOREIGN PATENT DOCUMENTS

| | | | | |
|---|---|---|---|---|
| EP | 2426460 A1 * | 2/2012 | | G01C 21/34 |

*Primary Examiner* — George Eng
*Assistant Examiner* — Hung Du
(74) *Attorney, Agent, or Firm* — Robert C. Kowert; Meyertons, Hood, Kivlin, Kowert & Goetzel, P.C.

(57) ABSTRACT

Embodiments of a system and method for tile-based reduction of access point location information are described. Embodiments may reduce a set of network access points and respective locations to generate a reduced set. For instance, embodiments may include parsing a representation of a geographic region into multiple tiles. Embodiments may also include, for each sub-area or "bucket" of multiple buckets that make up a given tile, evaluating the set of network access points and respective locations to identify network access points residing in that bucket, and based on a ranking of the network access points in that bucket, eliminating at least some network access points of that sub-area from the reduced set. Embodiments may also include, for each sub-tile of multiple sub-tiles of the given tile, assigning within the reduced set a common location to multiple access points residing within different locations of that sub-tile.

23 Claims, 10 Drawing Sheets

(56) References Cited

U.S. PATENT DOCUMENTS

| | | | |
|---|---|---|---|
| 2007/0244632 A1* | 10/2007 | Mueller | G01C 21/3446 |
| | | | 701/533 |
| 2008/0176583 A1* | 7/2008 | Brachet et al. | 455/456.3 |
| 2009/0149197 A1* | 6/2009 | Morgan et al. | 455/456.1 |
| 2010/0076968 A1* | 3/2010 | Boyns et al. | 707/732 |
| 2011/0176523 A1 | 7/2011 | Huang et al. | |
| 2012/0157115 A1* | 6/2012 | Jeong | H04W 24/02 |
| | | | 455/456.1 |

* cited by examiner

SYSTEM AND METHOD FOR TILE-BASED REDUCTION OF ACCESS POINT LOCATION INFORMATION

BACKGROUND

This application claims benefit of priority to U.S. Provisional Application Ser. No. 61/657,545, entitled "System And Method For Tile-Based Reduction Of Access Point Location Information," filed Jun. 8, 2012.

TECHNICAL FIELD

This disclosure relates generally to reducing a data set, and, more specifically, to reducing a data set that is used for determining the location of a multifunction device or a user of the multifunction device.

DESCRIPTION OF THE RELATED ART

The capability to determine a user's location can be found in a number of electronic devices including handheld Global Positioning System (GPS) Devices, as well as mobile phones that have GPS functionality. One common use for such devices includes determining a user's position for use within an application, such as a mapping or weather application. For instance, within a mapping application, a GPS position may be used to create a graphical indication of the user on a map. This graphical indication may also indicate the user's proximity to various points-of-interest, such as restaurants, public transit stations, hospitals, fuel stations, convenience stores or other commercial and non-commercial points of interest. In another example, a weather application may use a user's position to determine which weather forecast should be provided to the user.

SUMMARY OF EMBODIMENTS

Various embodiments of a system and method for tile-based reduction of access point location information are described. Embodiments may utilize a positioning technique that leverages known locations of network access points to identify the location of a positioning device, even in cases where the positioning device does not include other positioning functionality (e.g., GPS). Embodiments described herein may utilize quantization and decimation techniques to reduce the data footprint of access point location data and also make the data set more nimble to work with (e.g., by providing indexed based searching of the reduced data set).

For instance, embodiments may be configured to, based on an aggregate list of access points and associated locations (e.g., latitude and longitude coordinates), generate searchable tiles containing multiple access point identifiers associated with quantized locations which may be shared with other access point identifiers. For a given area referred to as a tile, embodiments may parse the tile into buckets and eliminate at least some access points from the data set based on a bucket-by-bucket analysis. For instance, for each bucket, the data set of access points may be decimated by ranking the access points in that bucket and removing poorly ranked access points from the data set. To quantize the data set, the tile may also be parsed into sub-tiles. Each sub-tile may be designated a geographic location, and multiple (e.g., all) access points within that sub-tile may be assigned that same location.

Once the aggregated list of access points and associated locations have been decimated and quantized, the resultant data set may include fewer overall access points for a given region (e.g., the data set may now be focused on the most popular or visible access points for that region), and many of these access points may share the same location due to quantization. These characteristics along with the principles of packing and compression may enable more useable access point location information to be stored in a given memory footprint (on both client side and server side).

Figure 1:
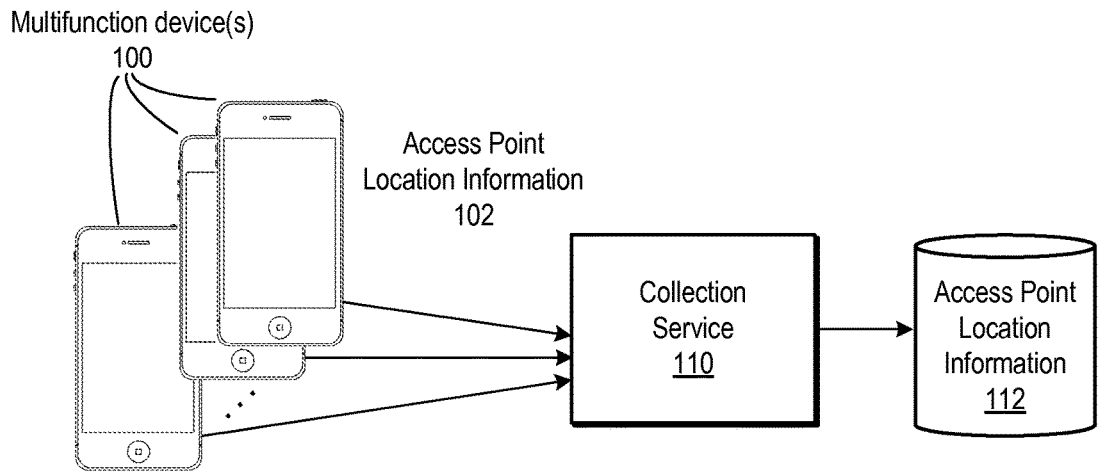
FIG. 1 illustrates a block diagram including a collection service for collecting access point location information in accordance with some embodiments.

This specification includes references to "one embodiment" or "an embodiment." The appearances of the phrases "in one embodiment" or "in an embodiment" do not necessarily refer to the same embodiment. Particular features, structures, or characteristics may be combined in any suitable manner consistent with this disclosure.

"Comprising." This term is open-ended. As used in the appended claims, this term does not foreclose additional structure or steps. Consider a claim that recites: "An apparatus comprising one or more processor units . . . . " Such a claim does not foreclose the apparatus from including additional components (e.g., a network interface unit, graphics circuitry, etc.).

"Configured To." Various units, circuits, or other components may be described or claimed as "configured to" perform a task or tasks. In such contexts, "configured to" is used to connote structure by indicating that the units/circuits/components include structure (e.g., circuitry) that performs those task or tasks during operation. As such, the unit/circuit/component can be said to be configured to perform the task even when the specified unit/circuit/component is not currently operational (e.g., is not on). The units/circuits/components used with the "configured to" language include hardware—for example, circuits, memory storing program instructions executable to implement the operation, etc. Reciting that a unit/circuit/component is "configured to" perform one or more tasks is expressly intended not to invoke 35 U.S.C. § 112, sixth paragraph, for that unit/circuit/component. Additionally, "configured to" can include generic structure (e.g., generic circuitry) that is manipulated by software and/or firmware (e.g., an FPGA or a general-purpose processor executing software) to operate in manner that is capable of performing the task(s) at issue. "Configure to" may also include adapting a manufacturing process (e.g., a semiconductor fabrication facility) to fabricate devices (e.g., integrated circuits) that are adapted to implement or perform one or more tasks.

"First," "Second," etc. As used herein, these terms are used as labels for nouns that they precede, and do not imply any type of ordering (e.g., spatial, temporal, logical, etc.). For example, a buffer circuit may be described herein as performing write operations for "first" and "second" values. The terms "first" and "second" do not necessarily imply that the first value must be written before the second value.

"Based On." As used herein, this term is used to describe one or more factors that affect a determination. This term does not foreclose additional factors that may affect a determination. That is, a determination may be solely based on those factors or based, at least in part, on those factors. Consider the phrase "determine A based on B." While in this case, B is a factor that affects the determination of A, such a phrase does not foreclose the determination of A from also being based on C. In other instances, A may be determined based solely on B.

DETAILED DESCRIPTION

Introduction

Various embodiments of a system and method for tile-based reduction of access point location information are described. Embodiments may utilize a positioning technique that leverages known locations of network access points (e.g., Wi-Fi and/or other types of data network access points) to identify the location of a positioning device, even in cases where the positioning device does not include other positioning functionality (e.g., GPS). Note that embodiments are not limited to Wi-Fi access points and may include access points adhering to other wireless communication standards. Given an access point identifier, embodiments may return a location associated with that access point identifier. Some positioning techniques based on known locations of access points may employ a one-to-one mapping between access point identifiers (e.g., MAC addresses) and location coordinates (e.g., latitude and longitude). Various embodiments described herein may utilize quantization and decimation techniques to reduce the data footprint of access point location data and also make the data set more nimble to work with (e.g., by providing indexed based searching of the quantized and decimated data set).

For instance, embodiments may be configured to, based on an aggregate list of access points and associated locations (e.g., latitude and longitude coordinates), generate searchable tiles containing multiple access point identifiers associated with quantized locations which may be shared with other access point identifiers. For a given area (e.g., a 0.05° latitude by 0.05° longitude area of the Earth) referred to as a tile, embodiments may parse the tile into n "buckets." Each bucket may correspond to a specific sub-area of the tile; embodiments may determine which access points map to that bucket based on the aforesaid aggregate list of access points and associated locations. For each bucket, embodiments may decimate the access points within that bucket using various criteria. In one non-limiting example, embodiments may keep the top 50% of access points in terms of a determined popularity score or ranking and discard the lower 50% (other techniques are described in more detail below). This process may be repeated for each bucket of a given tile. In various embodiments, the access points that remain in each tile's data set after decimation may be quantized. For instance, for a given tile, the tile may be parsed into m sub-tiles. Generally, this parsing process may result in more sub-tiles than the corresponding number of buckets used for decimation as described above (that is, generally m>n); as such, the area corresponding of each sub-tile will generally be smaller than the area corresponding to a given bucket. (Although in some cases the sub-tiles used for quantization may be the same as the buckets used for decimation.) To quantize all of the access points remaining after decimation, embodiments may, for each sub-tile, designate a location to that sub-tile and assign that location to multiple (e.g., all) access points residing within that sub-tile. In this way, in some embodiments, all access points within a given sub-tile may be assigned the same location (e.g., coordinates) even though such access points may not share the exact same location in reality.

Once the aggregated list of access points and associated locations have been decimated and quantized, the resultant data set may include fewer overall access points for a given region (e.g., the data set may now be focused on the most popular or visible access points for that region) and of these access points many may now share the same location due to quantization. These characteristics along with the principles of packing and compression may enable more useable access point location information to be stored in a given memory footprint, which may conserve memory space on client devices (e.g., smartphones) and server-side (e.g., on one or more servers implementing a service providing access point location data). By enabling more useable access point location information to be stored in a given memory footprint, embodiments may improve availability (e.g., instances in which a fix is acquired, even when no cellular data access is available on a client device) and decrease cellular data use (e.g., a client device will need to request less information from the server-side for a given geographical area). In general, the reduced data set described herein may cover a larger geographical area with a smaller memory footprint relative to the unreduced data set (e.g., a list of access points and respective locations).

By utilizing a data set reduced according to the decimation and quantization techniques described herein, client devices (such as the multifunction devices described herein) may pre-cache larger geographical areas in order to support off network access point (e.g., Wi-Fi) locations. This caching may also reduce the amount of server queries while the client device determines access point locations on the move. Having a larger geographical area cached may also reduce the time to first fix (e.g., the time a first location is determined on the device), which represents a convenience for the user.

Various embodiments described herein may include a multifunction device operated by a user. For example, a multifunction device may be a smartphone utilized by an individual to make phone calls, send text messages, browse the internet, etc. As use of multifunction device by an individual generally implies the individual is proximate to the multifunction device (e.g., the user may be holding the device in his or her hand), references herein to the location of the device and the location of the user may be considered to be synonymous. However, it should be understood that in some cases the actual position of the multifunction device and the user of that device may differ by some distance. For instance, the user may place his or her multifunction device on a table of an outdoor café while sitting in a nearby chair. In this case, the position of the device and the position of the user may differ by some small amount. In another example, a multifunction device may be mounted on a car dashboard (e.g., for use as a navigation device) while the user of the device sits nearby (e.g., in the driver seat of the car). In this case as well, the position of the device and the position of the user may differ by some small amount. Despite these small differences in position, generally the position of the multifunction device and the position of the multifunction device user may be considered to coincide.

Reference will now be made in detail to embodiments, examples of which are illustrated in the accompanying drawings. In the following detailed description, numerous specific details are set forth in order to provide a thorough understanding of the present embodiments. However, it will be apparent to one of ordinary skill in the art that the present embodiments may be practiced without these specific details. In other instances, well-known methods, procedures, components, circuits, and networks have not been described in detail so as not to unnecessarily obscure aspects of various embodiments.

Tile-Based Reduction of Access Point Location Information

Various embodiments of the system and method for tile-based reduction of access point location information may perform data set reduction on access point location information reported by client devices, such as any of the portable multifunction devices described above. FIG. 1 illustrates one example of the collection of access point location information. In the illustrated embodiment, one or more multifunction devices 100 may report access point location information 102 to a collection service 110. In various embodiments, each client device may generate its own access point location information 102. For instance, when a multifunction device detects an access point, such as access point 1310 described below, the multifunction device may record the location at which the access point was detected. In various embodiments, the multifunction device may record coordinates (e.g., latitude and longitude values) specifying the device location when the access point was detected, such as coordinates determined with GPS module 1035 or orientations sensors 1068 described below with respect to the example multifunction device. The multifunction device may also record an identifier for the detected access point, such as a media access control (MAC) address. The multifunction device may also record altitude, such as a determined or estimated altitude as described above with respect to orientation sensors 1068. The multifunction device may also record a measure of signal strength for the detected access point (e.g., generally the stronger the signal, the closer the multifunction device is to the access point). Any of the aforesaid information may be included as part of access point location information 102 and sent to collection service 110. Collection service may aggregate access point location information 102 into a data store of access point location information 112. In various embodiments, access point location information 112 may, for each access point of multiple access points across one or more regions, specify a corresponding location for that access point. In one non-limiting example, the records of access point location information may associate access point identifiers (e.g., MAC addresses) and specific locations (e.g., coordinates).

In various embodiments, collection service 452 may utilize crowd-sourcing techniques to curate access point location information for many different access points in a database of access point location information. For instance, some multifunction devices may have capabilities (e.g., GPS positioning) that other multifunction devices do not necessarily have. In one non-limiting example, a smartphone might contain GPS positioning functionality while a tablet device may not include GPS positioning functionality. In various embodiments, the group of multifunction devices 100 may be devices capable of independently verifying device location (e.g., via a GPS module). As described in more detail below, the access point location information collected from these devices may be used to assist less capable devices (e.g., devices without GPS positioning functionality) with determining position. For instance, embodiments may enable such devices to determine position based on one or more access point tiles as described in more detail below.

In some embodiments, access point location information 112 may be stored in structured or unstructured formats, such as a file of comma separated values (CSV) specifying different access points, respective locations (e.g., latitude and longitude coordinates), and/or other information. In some cases, access point location information 112 may be referred to herein as unreduced access point location information.

Figure 2:
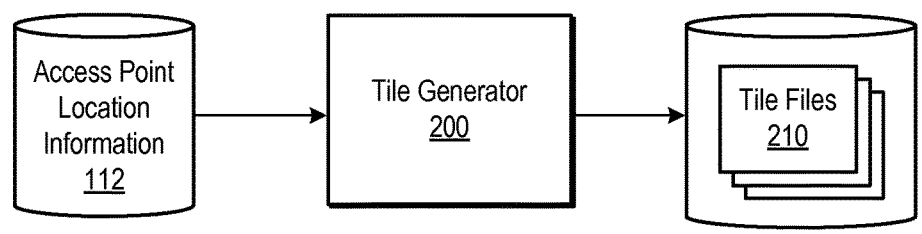
FIG. 2 illustrates a block diagram including a tile generator for creating tiles of access point location information in accordance with some embodiments.

FIG. 2 illustrates a tile generator configured to create tiles (e.g., the files 210) for multiple regions based on the access point location information 112. The techniques utilized by the tile generator are described in more detail below. Generally, tile generator 200 may be configured to utilize the decimation and quantization techniques described in more detail below in order to generate tile files 210 representing various regions. These files may be requested by client devices and used to identify the location of the device.

Figure 3:
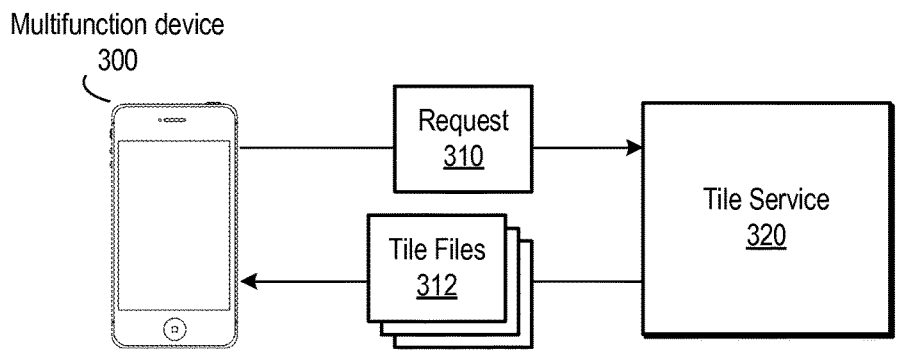
FIG. 3 illustrates a block of a tile service configured to provide tile files to multifunction devices in accordance with some embodiments.

FIG. 3 illustrates an example of a multifunction device 300 sending a service request 310 to a tile service 320. The service request 310 may specify one or more identifiers of access points detected by multifunction device 300 including but not limited to MAC addresses of access points. In one non-limiting example, multifunction device 300 may detect one or more nearby access points and send respective identifiers of the access point(s) in request 310. Tile service 320 may be configured to return one or more tile files indicating access points in the geographic region in which the specified access point resides and the surrounding areas, as illustrated by tile files 312. Multifunction device 300 may use the tile files to determine or infer the current location of the device, as described in more detail below.

Figure 4:
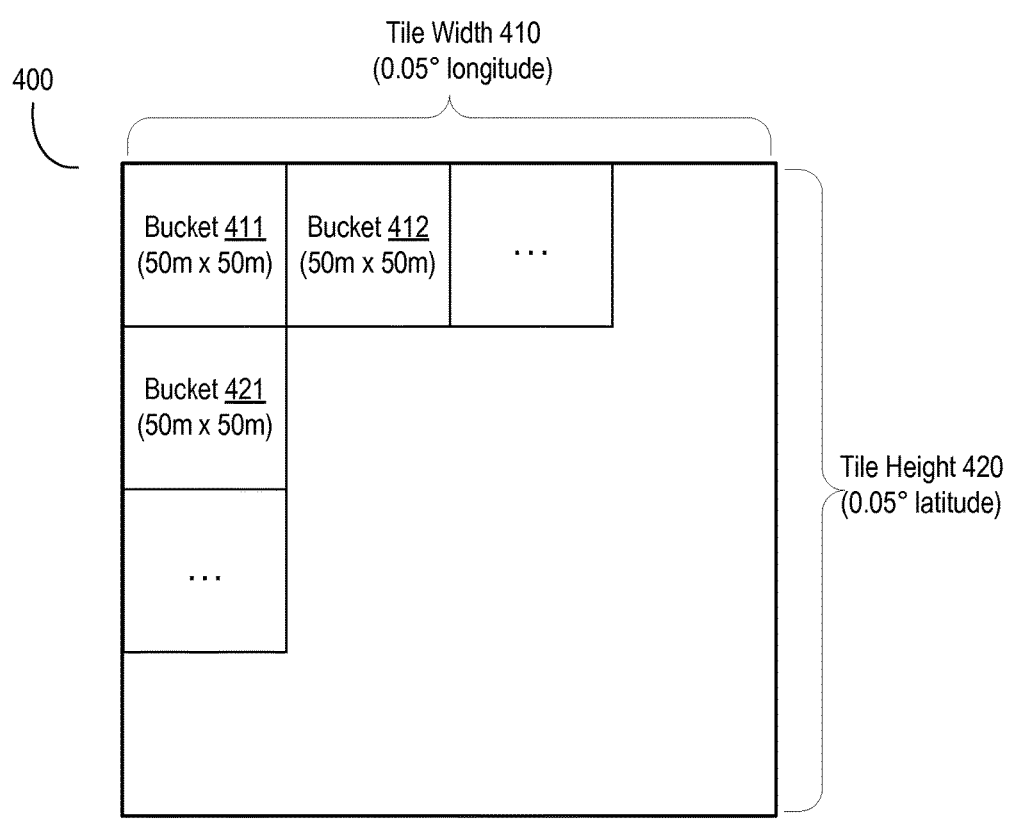
FIG. 4 illustrates an example tile for decimating a data set in accordance with some embodiments.

FIG. 4 illustrates a graphical representation of a tile 400 used to decimate the access point location information for a region. This region may be defined by a tile width 410 and a tile height 420. In the illustrated embodiment, tile width 410 is illustrated as being 0.05° longitude; tile height 420 is illustrated as being 0.05° latitude. These values are merely non-limiting examples. In other cases, other tiles sizes may be utilized. In the illustrated embodiment, tile generator 200 may generate tile 400 by parsing a region (e.g., a geographical region, city, state, country, and/or world, etc.) into multiple tiles. Each tile may also be parsed or divided into multiple sub-areas referred to herein as "buckets". In the illustrated embodiment, each bucket measures approximately 50 meters by 50 meters. These values are merely non-limiting examples. For each region having a corresponding tile, tile generator 200 may utilize a tile similar to tile 400 in order to perform decimation, which is described in more detail below with respect to FIG. 5. Generally, for a given tile, decimation may be performed as a bucket-by-bucket analysis that eliminates one or more access points from each bucket. In various embodiments, decimation may include exception cases in which access points are not removed from a bucket, such as when a bucket contains only one access point or a few access points.

In various embodiments, tile generator 200 may generate a stored representation of each tile (e.g., the 400). Furthermore, for each tile, tile generator 200 may also indicate within that stored representation which access points are located within each bucket of the tile. Generally, buckets may contain none, one, or multiple access points. In one non-limiting example, buckets representing locations that include urban areas may generally include more access points than buckets representing locations within rural areas. For at least some buckets of a tile, the decimation process described below may remove one or more access points from the data set. Various techniques for determining which access points should be removed from consideration are described in more detail below with respect to FIG. 5. In one non-limiting example, access points that are less popular or less visible to client devices in the field may be removed from the data set.

Figure 5:
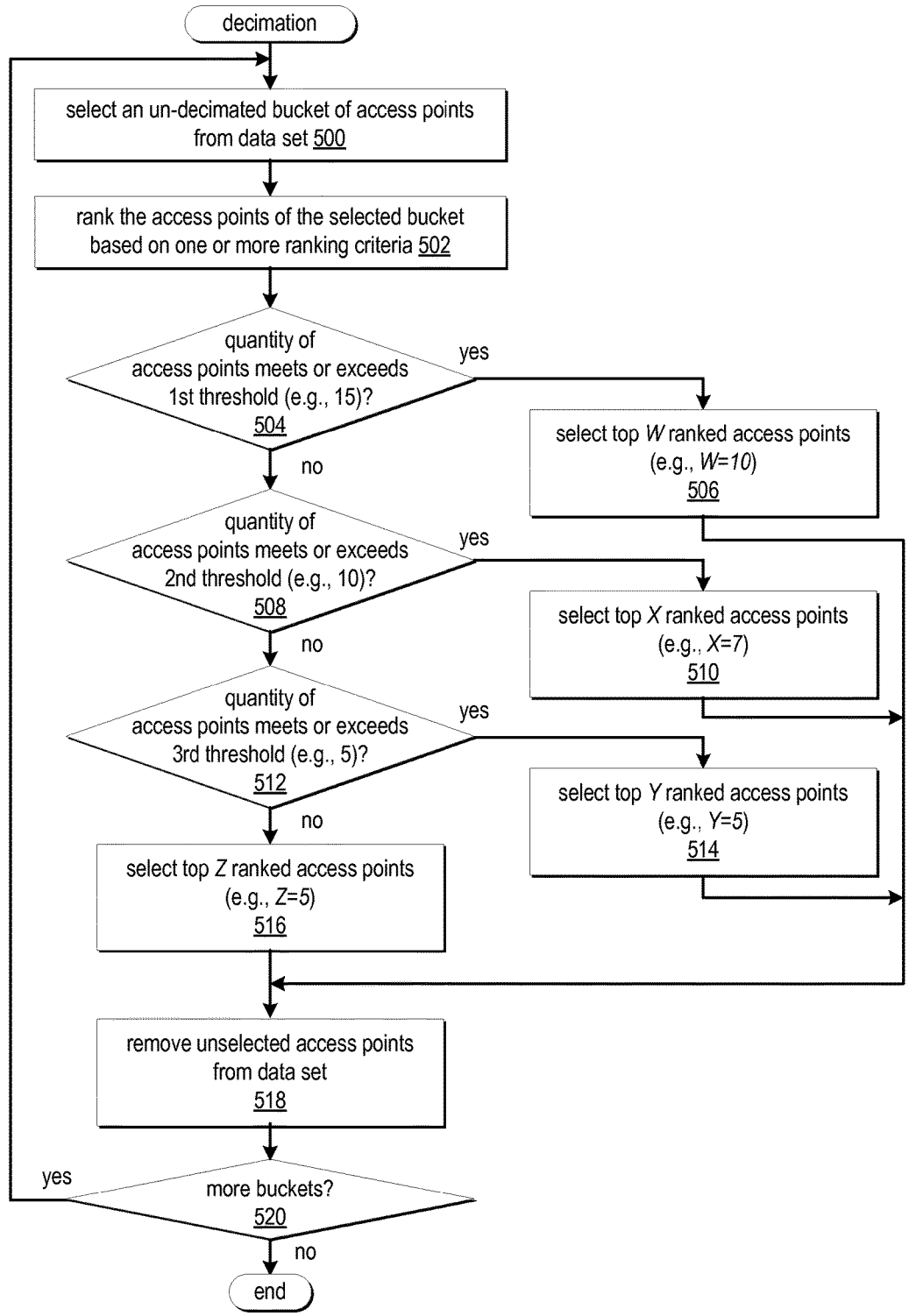
FIG. 5 illustrates a flowchart of example method decimating a data set in accordance with some embodiments.

FIG. 5 illustrates a flowchart of a decimation process. In various embodiments, tile generator 200 may be configured to perform decimation according to a method that is the same as or similar to the illustrated method. In various embodiments, the illustrated method may be performed by one or more computers, such as the computer illustrated in FIG. 12 below. In various embodiments, the illustrated method may be performed for a specific tile (e.g., the 400) and repeated for multiple other tiles.

As illustrated at block 500, the method may include selecting an un-decimated bucket of access points from the data set (e.g., a bucket of access points that has not yet been processed according to the illustrated method). In some cases, multiple buckets may be selected and processed in parallel. As illustrated at block 502, the method may include ranking the access points of the selected bucket based on one or more ranking criteria. In various embodiments, access points of a bucket may be ranked in order of descending visibility, which may be measured in different ways in different embodiments. In one example, the access points that are statistically "seen" the most may be ranked the highest. For instance, access points that have been reported the most by client devices (see e.g., FIG. 1) may be considered to be more visible than less frequently reported access points. In other cases, access points that have strong signal strength may be ranked higher than access points with weaker signal strength. In other cases, some combination of these ranking techniques may be utilized. Generally, it may be preferred to remove low visibility access points before higher visibility access points. For instance, when using the reduced data set to determine a device's location, the most visible access points may be the most likely to be detected by a client device in the field.

As illustrated by blocks 504 to 512, the method may utilize multiple tiers of thresholds to "thin" or decimate the data set. In block 504, the method may include determining whether the quantity of access point in the bucket exceeds a first threshold. In the illustrated embodiment, this first threshold is specified as 15 access points but need not be 15 in all cases; the illustrated thresholds are merely examples and different thresholds (and/or different quantities of thresholds) may be utilized in various embodiments. As illustrated by the positive output of block 504, the method may include selecting the top W ranked access points (block 506). In the illustrated embodiment, the value of W is specified as 10 access points but need not be 10 in all cases; the illustrated value for W is merely an example. As illustrated at block 518, access points that were not selected at block 506 are removed from the data set, which leaves the top W ranked access points remaining in the data set for the current bucket. As illustrated by the negative output of block 504, the method may proceed to block 508 if the quantity of access points in the bucket does not meet or exceed the first threshold.

In block 508, the method may include determining whether the quantity of access point in the bucket exceeds a second threshold. In the illustrated embodiment, this second threshold is specified as 10 access points but need not be 10 in all cases; the illustrated thresholds are merely examples and different thresholds may be utilized in various embodiments. As illustrated by the positive output of block 508, the method may include selecting the top X ranked access points (block 510). In the illustrated embodiment, the value of X is specified as seven access points but need not be seven in all cases; the illustrated value for X is merely an example. As illustrated at block 518, access points that were not selected at block 510 are removed from the data set, which leaves the top X ranked access points remaining in the data set for the current bucket. As illustrated by the negative output of block 508, the method may proceed to block 512 if the quantity of access points in the bucket does not meet or exceed the second threshold.

In block 512, the method may include determining whether the quantity of access point in the bucket exceeds a third threshold. In the illustrated embodiment, this third threshold is specified as five access points but need not be five in all cases; the illustrated thresholds are merely examples and different thresholds may be utilized in various embodiments. As illustrated by the positive output of block 512, the method may include selecting the top Y ranked access points (block 514). In the illustrated embodiment, the value of Y is specified as five access points but need not be five in all cases; the illustrated value for Y is merely an example. As illustrated at block 518, access points that were not selected at block 510 are removed from the data set, which leaves the top Y ranked access points remaining in the data set for the current bucket. As illustrated by the negative output of block 512, the method may proceed to block 516 if the quantity of access points in the bucket does not meet or exceed the third threshold.

At block 516, the method may select the top Z ranked access. In the illustrated embodiment, the value of Z is specified as five access points but need not be five in all cases; the illustrated value for Z is merely an example. Generally, some or all of the access points not eliminated by the thresholds of block 504, 508 and 512 may be selected at block 518. As illustrated at block 518, access points that were not selected at block 516 are removed from the data set, which leaves the top Z ranked access points remaining in the data set for the current bucket.

At block 520, the method may include determining whether any more unprocessed buckets remain for the access point tile. If it is determine that additional buckets remain unprocessed, the method may proceed to block 500 at which point the method is performed for another bucket. If it is determine that no additional buckets remain, the method may end.

After tile generator 200 performs decimation (e.g., in accordance with the method of FIG. 5), the access point location information for a given region may be reduced as less significant access points (e.g., low visibility access points) are culled from the data set. As described in more detail below, the reduced data footprint of the reduced access point location information may enable access point location information covering a larger geographical region to be stored for a given cache size on client devices. Generally caching a large geographical area of access point location information may enable client devices that do not have dedicated positioning hardware (e.g., a GPS component) and/or cellular data connectivity to determine device location more consistently.

Figure 6:
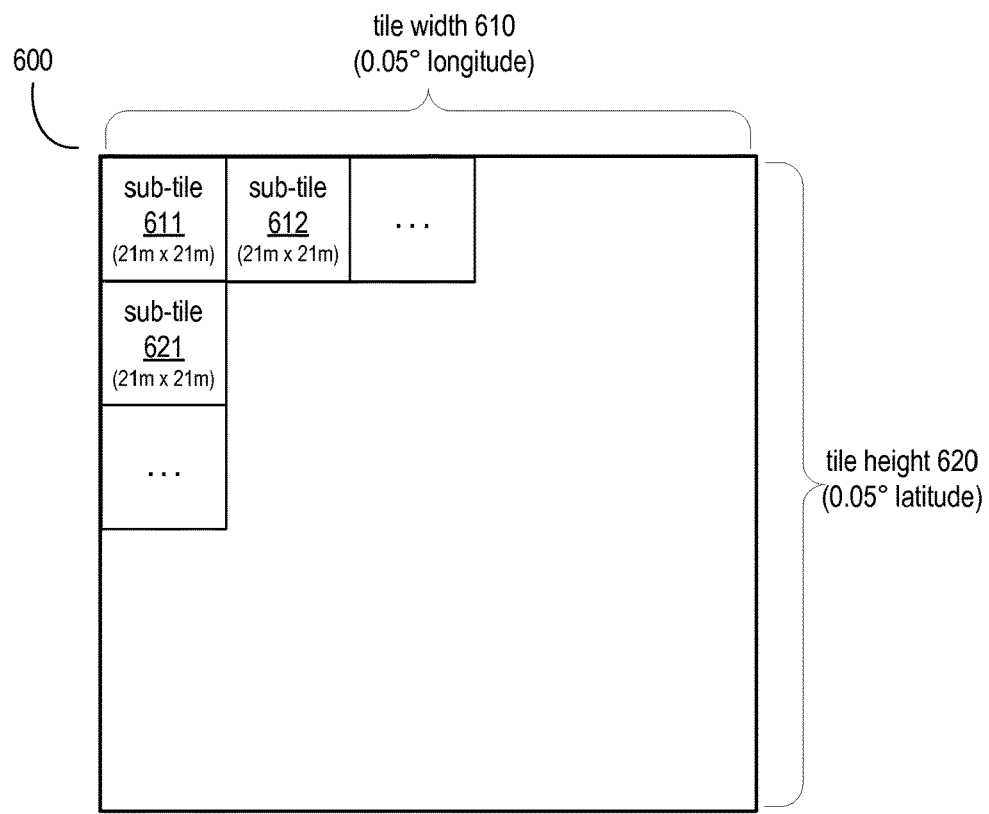
FIG. 6 illustrates an example tile for quantizing a data set in accordance with some embodiments.

While decimation may cull less significant access points from the data set, embodiments may also utilize quantization and indices to further reduce the data size of the decimated data set. An example of the quantization process utilized by tile generator 200 is described in more detail with respect to FIGS. 6 and 7. FIG. 6 illustrates a tile 600, which may be the same as or similar to tile 400 described above. This region may be defined by a tile width 610 and a tile height 620. In the illustrated embodiment, tile width 610 is illustrated as being 0.05° longitude; tile height 620 is illustrated as being 0.05° latitude. These values are merely non-limiting examples. In other cases, other tiles sizes may be utilized. In the illustrated embodiment, tile generator 200 may generate tile 600 by parsing a region (e.g., a geographical region, city, state, country, and/or world, etc.) into multiple tiles. Generally the tiles used for decimation and the tiles used for quantization will be of the same size and cover the same area. For quantization, each tile may also be parsed or divided into multiple sub-areas referred to herein as "sub-tiles". In the illustrated embodiment, each sub-tile measures approximately 21 meters by 21 meters. These values are merely non-limiting examples. In the illustrated embodiment, the sub-tile size chosen is based on an indexed addressing scheme. For instance, one byte may address up to 256 different positions. By using two bytes, embodiments may reference up to 65,536 unique sub-tiles within a tile (e.g., 256 rows and 256 columns). In the illustrated embodiment, the sub-tiles may be approximately 21 meters square as 0.05° longitude or latitude divided by 256 equates to 0.0015°, which is approximately 21 meters on Earth. For each region having a corresponding tile, tile generator 200 may utilize a tile similar to tile 600 in order to perform quantization, which is described in more detail below with respect to FIG. 7. Generally, for a given tile, quantization may be performed as a sub-tile by sub-tile analysis that designates a geographical location to the sub-tile and assigns that geographical location to multiple (e.g., all) access points within the sub-tile. This may reduce the accuracy of the access point locations by an acceptable amount while enabling an indexing scheme that reduces the memory footprint of the access point location information.

Figure 7:
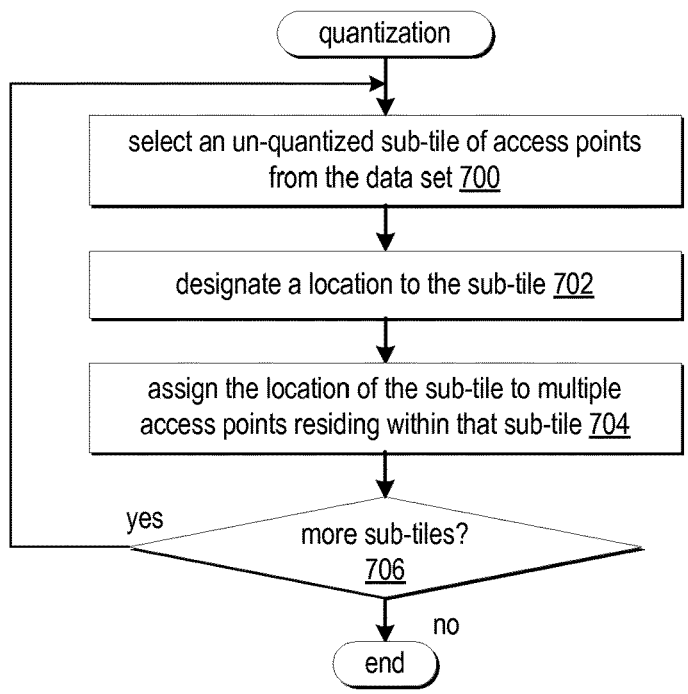
FIG. 7 illustrates a flowchart of example method quantizing a data set in accordance with some embodiments.

FIG. 7 illustrates a flowchart of a quantization process. In various embodiments, tile generator 200 may be configured to perform decimation according to a method that is the same as or similar to the illustrated method. In various embodiments, the illustrated method may be performed by one or more computers, such as the computer illustrated in FIG. 12 below. In various embodiments, the illustrated method may be performed for a specific tile (e.g., the 600) and repeated for multiple other tiles.

As illustrated at block 700, the method may include selecting an un-quantized sub-tile of access points from the data set (e.g., a sub-tile of access points that has not yet been processed according to the illustrated method). In some cases, multiple sub-tiles may be selected and processed in parallel. As illustrated at block 702, the method may include designating a location to the sub-tile. The specific location may be configurable, but in various embodiments will be consistent across sub-tiles. For instance, if a tile is referenced by the geographic location of that tile's northwest corner, each sub-tile's location may be designated as the northwest corner of that sub-tile.

As illustrated at block 704, the method may include assigning the designated location of the sub-tile to all access points residing in the geographic region represented by that sub-tile. In this way, multiple access points having different locations within a sub-tile may be reassigned to a common location. This may reduce the accuracy of the access point locations by an acceptable amount while enabling an indexing scheme that reduces the memory footprint of the access point location information. The indexing scheme is described in more detail below with respect to the file structure of FIG. 8. As illustrated, the method may include determining whether there are more sub-tiles for the tile being evaluated. If there are, the method may return to block 700. If there are not more sub-tiles to be evaluated, the method may end.

Figure 8:
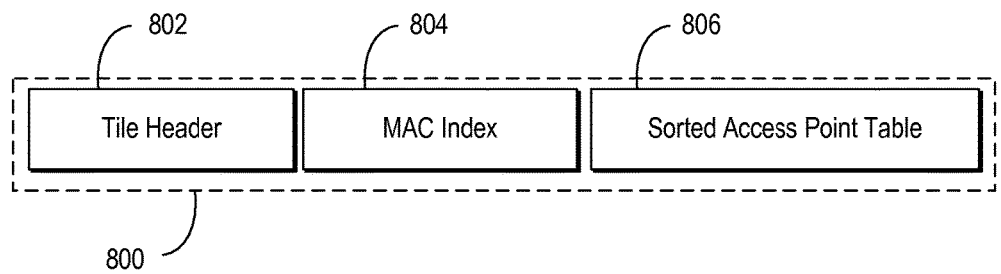
FIG. 8 illustrates an example of the structure of a tile file in accordance with some embodiments.

FIG. 8 illustrates the structure of a tile file according to some embodiments. In various embodiments, the illustrated tile file may represent one or more of tiles files 210 described above. As illustrated, the tile file may include a tile header 802, which may include but is not limited to header information, an x-y coordinate of the tile, a geographic location of the tile (e.g., latitude and longitude coordinates specifying a geographic location of a corner of the tile), and/or altitude information. The file may also include a MAC address index 804 into a table of sorted access points 806. In various embodiments, each access points may be referenced by its MAC address and x-y coordinates that are based on the sub-tile grid created during quantization (as described above). The associated geographic location may be inferred from these x-y coordinates and the known location of the overall tile (e.g., as specified by the tile header). In various embodiments, use of a MAC index into the table of access points may reduce the overall time to locate the entry for a specific access point. For instance, instead of performing a search of the entire access point table, the index may scope the search to a much smaller section of the table. In one non-limiting example, use of an index may reduce the search space from 100% of the access point table down to approximately 5% of the access point table. Generally, to determine a location for the device based on an observed access point, the location component (described below) may read the tile index and search (e.g., binary search) the index to identify the relevant portion of the access point table. The tile manager may then read the relevant section from the access point table and search (e.g., binary search) that section for the observed access point. Tiles that are not already stored locally may be added to the acquisition list (described below) and downloaded when connectivity becomes available.

Figure 9:
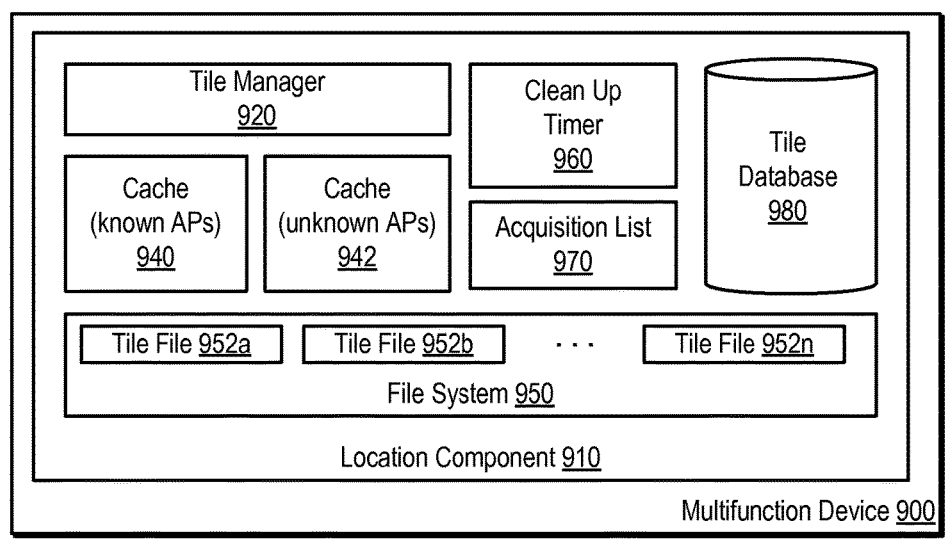
FIG. 9 illustrates a block diagram of a location component configured to use tiles for determining a location in accordance with some embodiments.

FIG. 9 illustrates a location component of a multifunction device. In the illustrated embodiment, other components that may be included as part of a multifunction device are described below with respect to FIGS. 10-11 but are absent from FIG. 9 for clarity of illustration. In the illustrated embodiment, a location component 910 of multifunction device 900 may be configured to determine a past or present location of the multifunction device based on tile files 952a-n of file system 950. In various embodiments, these files may be similar to or the same as tile files 210 described above and may have a structure that is similar to or the same as tile file 800 described above. Tile manager 920 may be configured to manage the acquisition of tile files and request needed tiles from a tile service, such as illustrated in FIG. 3. In the illustrated embodiment, tile manager 920 may maintain caches for the most recently used known and unknown access points, which are illustrated as caches 940 and 942. In various embodiments, the location component may collect visible access points periodically or aperiodically (e.g., throughout the day). For instance, such collection may be performed through opportunistic Wi-Fi scans on the multifunction device; those access points may be queried when connectivity is available. Furthermore, when those access points become known, the multifunction device may download tiles for those access points as well as surrounding tiles. In various embodiments, the MAC addresses of access points corresponding to desired tiles may be added to acquisition list 970 and opportunistically downloaded when connectivity is available. The corresponding tiles (e.g., tiles 952*a-n*) may be received and tile manager 920 may generate a tile database 980 that may be used to identify device location based on access point identifiers (e.g., a MAC address) at runtime. This location may be used in a variety of location-aware applications on the multifunction devices including but not limited to mapping applications, navigation application, weather applications, and/or social networking applications.

In various embodiments, one or more security measures may be implemented by the location component. For instance, a clean up timer 960 may be utilized to trigger the removal of tiles not used for a certain time period (e.g., 7 days). In some embodiments, the tile files may be encrypted on file system 950. Furthermore, when location services are switched off on the multifunction device, the tile manager may delete all cached tiles. In some embodiments, file names of tile files may be scrambled (e.g., through use of random filenames). Generally, a tile file may contain all the information needed in order to use the tile without relying on the filename.

Example Multifunction Device

Embodiments of electronic devices, user interfaces for such devices, and associated processes for using such devices are described. In some embodiments, the device is a portable communications device, such as a mobile telephone, that also contains other functions, such as PDA and/or music player functions. Exemplary embodiments of portable multifunction devices include, without limitation, the iPhone®, iPod Touch®, and iPad® devices from Apple Inc. of Cupertino, Calif. Other portable electronic devices, such as laptops or tablet computers with touch-sensitive surfaces (e.g., touch screen displays and/or touch pads), may also be used. It should also be understood that, in some embodiments, the device is not a portable communications device, but is a desktop computer with a touch-sensitive surface (e.g., a touch screen display and/or a touch pad). In some embodiments, the device is a gaming computer with orientation sensors (e.g., orientation sensors in a gaming controller).

In the discussion that follows, an electronic device that includes a display and a touch-sensitive surface is described. It should be understood, however, that the electronic device may include one or more other physical user-interface devices, such as a physical keyboard, a mouse and/or a joystick.

The device typically supports a variety of applications, such as one or more of the following: a drawing application, a presentation application, a word processing application, a website creation application, a disk authoring application, a spreadsheet application, a gaming application, a telephone application, a video conferencing application, an e-mail application, an instant messaging application, a workout support application, a photo management application, a digital camera application, a digital video camera application, a web browsing application, a digital music player application, and/or a digital video player application.

The various applications that may be executed on the device may use at least one common physical user-interface device, such as the touch-sensitive surface. One or more functions of the touch-sensitive surface as well as corresponding information displayed on the device may be adjusted and/or varied from one application to the next and/or within a respective application. In this way, a common physical architecture (such as the touch-sensitive surface) of the device may support the variety of applications with user interfaces that are intuitive and transparent to the user.

Figure 10A:
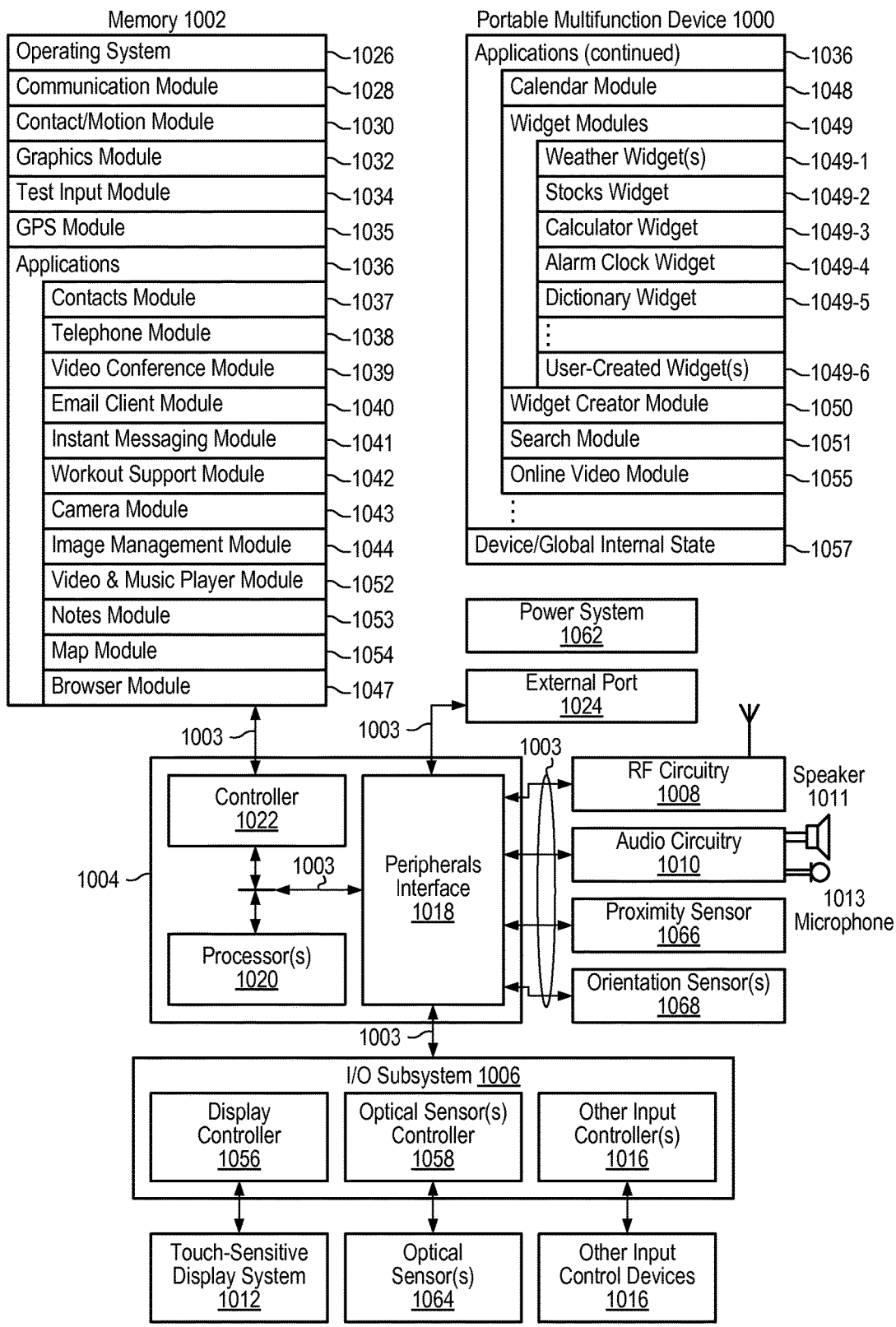
FIGS. 10A-B illustrate an example multifunction device in accordance with some embodiments.

Attention is now directed toward embodiments of portable devices with touch-sensitive displays. FIG. 10A is a block diagram illustrating portable multifunction device 1000 with touch-sensitive displays 1012 in accordance with some embodiments. Touch-sensitive display 1012 is sometimes called a "touch screen" for convenience, and may also be known as or called a touch-sensitive display system. Device 1000 may include memory 1002 (which may include one or more computer readable storage mediums), memory controller 1022, one or more processing units (CPU's) 1020, peripherals interface 1018, RF circuitry 1008, audio circuitry 1010, speaker 1011, microphone 1013, input/output (I/O) subsystem 1006, other input or control devices 1016, and external port 1024. Device 1000 may include one or more optical sensors 1064. These components may communicate over one or more communication buses or signal lines 1003.

It should be appreciated that device 1000 is only one example of a portable multifunction device, and that device 1000 may have more or fewer components than shown, may combine two or more components, or may have a different configuration or arrangement of the components. The various components shown in FIG. 10A may be implemented in hardware, software, or a combination of both hardware and software, including one or more signal processing and/or application specific integrated circuits.

Memory 1002 may include high-speed random access memory and may also include non-volatile memory, such as one or more magnetic disk storage devices, flash memory devices, or other non-volatile solid-state memory devices. Access to memory 1002 by other components of device 1000, such as CPU 1020 and the peripherals interface 1018, may be controlled by memory controller 1022.

Peripherals interface 1018 can be used to couple input and output peripherals of the device to CPU 1020 and memory 1002. The one or more processors 1020 run or execute various software programs and/or sets of instructions stored in memory 1002 to perform various functions for device 1000 and to process data.

In some embodiments, peripherals interface 1018, CPU 1020, and memory controller 1022 may be implemented on a single chip, such as chip 1004. In some other embodiments, they may be implemented on separate chips.

RF (radio frequency) circuitry 1008 receives and sends RF signals, also called electromagnetic signals. RF circuitry 1008 converts electrical signals to/from electromagnetic signals and communicates with communications networks and other communications devices via the electromagnetic signals. RF circuitry 1008 may include well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. RF circuitry 1008 may communicate with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The wireless communication may use any of multiple communications standards, protocols and technologies, including but not limited to Global System for Mobile Communications (GSM), Enhanced Data GSM Environment (EDGE), high-speed downlink packet access (HSDPA), high-speed uplink packet access (HSUPA), wideband code division multiple access (W-CDMA), code division multiple access (CDMA), time division multiple access (TDMA), Bluetooth, Wireless Fidelity (Wi-Fi) (e.g., IEEE 802.11a, IEEE 802.11b, IEEE 802.11g and/or IEEE 802.11n), voice over Internet Protocol (VoIP), Wi-MAX, a protocol for e-mail (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), Instant Messaging and Presence Service (IMPS)), and/or Short Message Service (SMS), or any other suitable communication protocol, including communication protocols not yet developed as of the filing date of this document.

Audio circuitry 1010, speaker 1011, and microphone 1013 provide an audio interface between a user and device 100. Audio circuitry 1010 receives audio data from peripherals interface 1018, converts the audio data to an electrical signal, and transmits the electrical signal to speaker 1011. Speaker 1011 converts the electrical signal to human-audible sound waves. Audio circuitry 1010 also receives electrical signals converted by microphone 1013 from sound waves. Audio circuitry 1010 converts the electrical signal to audio data and transmits the audio data to peripherals interface 1018 for processing. Audio data may be retrieved from and/or transmitted to memory 1002 and/or RF circuitry 1008 by peripherals interface 1018. In some embodiments, audio circuitry 1010 also includes a headset jack (e.g., 1112, FIG. 11). The headset jack provides an interface between audio circuitry 1010 and removable audio input/output peripherals, such as output-only headphones or a headset with both output (e.g., a headphone for one or both ears) and input (e.g., a microphone).

I/O subsystem 1006 couples input/output peripherals on device 1000, such as touch screen 1012 and other input control devices 1016, to peripherals interface 1018. I/O subsystem 1006 may include display controller 1056 and one or more input controllers 1060 for other input or control devices. The one or more input controllers 1060 receive/send electrical signals from/to other input or control devices 116. The other input control devices 1016 may include physical buttons (e.g., push buttons, rocker buttons, etc.), dials, slider switches, joysticks, click wheels, and so forth. In some alternate embodiments, input controller(s) 1060 may be coupled to any (or none) of the following: a keyboard, infrared port, USB port, and a pointer device such as a mouse. The one or more buttons (e.g., 1108, FIG. 11) may include an up/down button for volume control of speaker 1011 and/or microphone 1013. The one or more buttons may include a push button (e.g., 1106, FIG. 11).

Touch-sensitive display 1012 provides an input interface and an output interface between the device and a user. Display controller 1056 receives and/or sends electrical signals from/to touch screen 1012. Touch screen 1012 displays visual output to the user. The visual output may include graphics, text, icons, video, and any combination thereof (collectively termed "graphics"). In some embodiments, some or all of the visual output may correspond to user-interface objects.

Touch screen 1012 has a touch-sensitive surface, sensor or set of sensors that accepts input from the user based on haptic and/or tactile contact. Touch screen 1012 and display controller 1056 (along with any associated modules and/or sets of instructions in memory 1002) detect contact (and any movement or breaking of the contact) on touch screen 1012 and converts the detected contact into interaction with user-interface objects (e.g., one or more soft keys, icons, web pages or images) that are displayed on touch screen 1012. In an exemplary embodiment, a point of contact between touch screen 1012 and the user corresponds to a finger of the user.

Touch screen 1012 may use LCD (liquid crystal display) technology, LPD (light emitting polymer display) technology, or LED (light emitting diode) technology, although other display technologies may be used in other embodiments. Touch screen 1012 and display controller 1056 may detect contact and any movement or breaking thereof using any of multiple touch sensing technologies now known or later developed, including but not limited to capacitive, resistive, infrared, and surface acoustic wave technologies, as well as other proximity sensor arrays or other elements for determining one or more points of contact with touch screen 1012. In an exemplary embodiment, projected mutual capacitance sensing technology is used, such as that found in the iPhone®, iPod Touch®, and iPad® from Apple Inc. of Cupertino, Calif.

Touch screen 1012 may have a video resolution in excess of 100 dpi. In some embodiments, the touch screen has a video resolution of approximately 300 dpi. The user may make contact with touch screen 1012 using any suitable object or appendage, such as a stylus, a finger, and so forth. In some embodiments, the user interface is designed to work primarily with finger-based contacts and gestures, which can be less precise than stylus-based input due to the larger area of contact of a finger on the touch screen. In some embodiments, the device translates the rough finger-based input into a precise pointer/cursor position or command for performing the actions desired by the user.

In some embodiments, in addition to the touch screen, device 1000 may include a touchpad (not shown) for activating or deactivating particular functions. In some embodiments, the touchpad is a touch-sensitive area of the device that, unlike the touch screen, does not display visual output. The touchpad may be a touch-sensitive surface that is separate from touch screen 1012 or an extension of the touch-sensitive surface formed by the touch screen.

Device 1000 also includes power system 1062 for powering the various components. Power system 1062 may include a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable devices.

Device 1000 may also include one or more optical sensors 1064. FIG. 10A shows an optical sensor coupled to optical sensor controller 1058 in I/O subsystem 1006. Optical sensor 1064 may include charge-coupled device (CCD) or complementary metal-oxide semiconductor (CMOS) phototransistors. Optical sensor 1064 receives light from the environment, projected through one or more lens, and converts the light to data representing an image. In conjunction with imaging module 1043 (also called a camera module), optical sensor 1064 may capture still images or video. In some embodiments, an optical sensor is located on the back of device 1000, opposite touch screen display 1012 on the front of the device, so that the touch screen display may be used as a viewfinder for still and/or video image acquisition. In some embodiments, another optical sensor is located on the front of the device so that the user's image may be obtained for videoconferencing while the user views the other video conference participants on the touch screen display.

Device 1000 may also include one or more proximity sensors 1066. FIG. 10A shows proximity sensor 1066 coupled to peripherals interface 1018. Alternately, proximity sensor 166 may be coupled to input controller 1060 in I/O subsystem 1006. In some embodiments, the proximity sensor turns off and disables touch screen 1012 when the multifunction device is placed near the user's ear (e.g., when the user is making a phone call).

Device 1000 includes one or more orientation sensors 1068. In some embodiments, the one or more orientation sensors include one or more accelerometers (e.g., one or more linear accelerometers and/or one or more rotational accelerometers). In some embodiments, the one or more orientation sensors include one or more gyroscopes. In some embodiments, the one or more orientation sensors include one or more magnetometers. In some embodiments, the one or more orientation sensors include one or more altimeters configured to determine or estimate the altitude of the multifunction device. In some embodiments, the one or more orientation sensors include one or more of global positioning system (GPS), Global Navigation Satellite System (GLONASS), and/or other global navigation system receivers. The GPS, GLONASS, and/or other global navigation system receivers may be used for obtaining information concerning the location and orientation (e.g., portrait or landscape) of device 1000. In some embodiments, the one or more orientation sensors include any combination of orientation/rotation sensors. FIG. 10A shows the one or more orientation sensors 1068 coupled to peripherals interface 1018. Alternately, the one or more orientation sensors 1068 may be coupled to an input controller 1060 in I/O subsystem 1006. In some embodiments, information is displayed on the touch screen display in a portrait view or a landscape view based on an analysis of data received from the one or more orientation sensors.

In some embodiments, the software components stored in memory 1002 include operating system 1026, communication module (or set of instructions) 1028, contact/motion module (or set of instructions) 1030, graphics module (or set of instructions) 1032, text input module (or set of instructions) 1034, Global Positioning System (GPS) module (or set of instructions) 1035, and applications (or sets of instructions) 1036. Furthermore, in some embodiments memory 1002 stores device/global internal state 1057, as shown in FIGS. 10A. Device/global internal state 1057 includes one or more of: active application state, indicating which applications, if any, are currently active; display state, indicating what applications, views or other information occupy various regions of touch screen display 1012; sensor state, including information obtained from the device's various sensors and input control devices 1016; and location information concerning the device's location and/or attitude.

Operating system 1026 (e.g., Darwin, RTXC, LINUX, UNIX, OS X, WINDOWS, or an embedded operating system such as VxWorks) includes various software components and/or drivers for controlling and managing general system tasks (e.g., memory management, storage device control, power management, etc.) and facilitates communication between various hardware and software components.

Communication module 1028 facilitates communication with other devices over one or more external ports 1024 and also includes various software components for handling data received by RF circuitry 1008 and/or external port 1024. External port 1024 (e.g., Universal Serial Bus (USB), FIREWIRE, etc.) is adapted for coupling directly to other devices or indirectly over a network (e.g., the Internet, wireless LAN, etc.). In some embodiments, the external port is a multi-pin (e.g., 30-pin) connector that is the same as, or similar to and/or compatible with the 30-pin connector used on iPod (trademark of Apple Inc.) devices.

Contact/motion module 1030 may detect contact with touch screen 1012 (in conjunction with display controller 1056) and other touch sensitive devices (e.g., a touchpad or physical click wheel). Contact/motion module 1030 includes various software components for performing various operations related to detection of contact, such as determining if contact has occurred (e.g., detecting a finger-down event), determining if there is movement of the contact and tracking the movement across the touch-sensitive surface (e.g., detecting one or more finger-dragging events), and determining if the contact has ceased (e.g., detecting a finger-up event or a break in contact). Contact/motion module 1030 receives contact data from the touch-sensitive surface. Determining movement of the point of contact, which is represented by a series of contact data, may include determining speed (magnitude), velocity (magnitude and direction), and/or an acceleration (a change in magnitude and/or direction) of the point of contact. These operations may be applied to single contacts (e.g., one finger contacts) or to multiple simultaneous contacts (e.g., "multitouch"/multiple finger contacts). In some embodiments, contact/motion module 1030 and display controller 1056 detect contact on a touchpad.

Contact/motion module 1030 may detect a gesture input by a user. Different gestures on the touch-sensitive surface have different contact patterns. Thus, a gesture may be detected by detecting a particular contact pattern. For example, detecting a finger tap gesture includes detecting a finger-down event followed by detecting a finger-up (lift off) event at the same position (or substantially the same position) as the finger-down event (e.g., at the position of an icon). As another example, detecting a finger swipe gesture on the touch-sensitive surface includes detecting a finger-down event followed by detecting one or more finger-dragging events, and subsequently followed by detecting a finger-up (lift off) event.

Graphics module 1032 includes various known software components for rendering and displaying graphics on touch screen 1012 or other display, including components for changing the intensity of graphics that are displayed. As used herein, the term "graphics" includes any object that can be displayed to a user, including without limitation text, web pages, icons (such as user-interface objects including soft keys), digital images, videos, animations and the like.

In some embodiments, graphics module 1032 stores data representing graphics to be used. Each graphic may be assigned a corresponding code. Graphics module 1032 receives, from applications etc., one or more codes specifying graphics to be displayed along with, if necessary, coordinate data and other graphic property data, and then generates screen image data to output to display controller 1056.

Text input module 134, which may be a component of graphics module 1032, provides soft keyboards for entering text in various applications (e.g., contacts 1037, e-mail 1040, IM 1041, browser 1047, and any other application that needs text input).

GPS module 1035 determines the location of the device and provides this information for use in various applications (e.g., to telephone 1038 for use in location-based dialing, to camera 1043 as picture/video metadata, and to applications that provide location-based services such as weather widgets, local yellow page widgets, and map/navigation widgets).

Applications 1036 may include the following modules (or sets of instructions), or a subset or superset thereof:
- contacts module 1037 (sometimes called an address book or contact list);
- telephone module 1038;
- video conferencing module 1039;
- e-mail client module 1040;
- instant messaging (IM) module 1041;
- workout support module 1042;
- camera module 1043 for still and/or video images;
- image management module 1044;
- browser module 1047;
- calendar module 1048;
- widget modules 1049, which may include one or more of: weather widget 1049-1, stocks widget 1049-2, calculator widget 1049-3, alarm clock widget 1049-4, dictionary widget 1049-5, and other widgets obtained by the user, as well as user-created widgets 1049-6;
- widget creator module 1050 for making user-created widgets 1049-6;
- search module 1051;
- video and music player module 1052, which may be made up of a video player
- module and a music player module;
- notes module 1053;
- map module 1054; and/or
- online video module 1505.

Examples of other applications 1036 that may be stored in memory 1002 include other word processing applications, other image editing applications, drawing applications, presentation applications, JAVA-enabled applications, encryption, digital rights management, voice recognition, and voice replication.

In conjunction with touch screen 1012, display controller 1056, contact module 1030, graphics module 1032, and text input module 1034, contacts module 1037 may be used to manage an address book or contact list (e.g., stored in application internal state 1092 of contacts module 1037 in memory 1002), including: adding name(s) to the address book; deleting name(s) from the address book; associating telephone number(s), e-mail address(es), physical address(es) or other information with a name; associating an image with a name; categorizing and sorting names; providing telephone numbers or e-mail addresses to initiate and/or facilitate communications by telephone 1038, video conference 1039, e-mail 1040, or IM 1041; and so forth.

In conjunction with RF circuitry 1008, audio circuitry 1010, speaker 1011, microphone 1013, touch screen 1012, display controller 1056, contact module 1030, graphics module 1032, and text input module 1034, telephone module 1038 may be used to enter a sequence of characters corresponding to a telephone number, access one or more telephone numbers in address book 1037, modify a telephone number that has been entered, dial a respective telephone number, conduct a conversation and disconnect or hang up when the conversation is completed. As noted above, the wireless communication may use any of multiple communications standards, protocols and technologies.

In conjunction with RF circuitry 1008, audio circuitry 1010, speaker 1011, microphone 1013, touch screen 1012, display controller 1056, optical sensor 1064, optical sensor controller 1058, contact module 1030, graphics module 1032, text input module 1034, contact list 1037, and telephone module 1038, videoconferencing module 1039 includes executable instructions to initiate, conduct, and terminate a video conference between a user and one or more other participants in accordance with user instructions.

In conjunction with RF circuitry 1008, touch screen 1012, display controller 1056, contact module 1030, graphics module 1032, and text input module 1034, e-mail client module 1040 includes executable instructions to create, send, receive, and manage e-mail in response to user instructions. In conjunction with image management module 1044, e-mail client module 1040 makes it very easy to create and send e-mails with still or video images taken with camera module 1043.

In conjunction with RF circuitry 1008, touch screen 1012, display controller 1056, contact module 1030, graphics module 1032, and text input module 1034, the instant messaging module 1041 includes executable instructions to enter a sequence of characters corresponding to an instant message, to modify previously entered characters, to transmit a respective instant message (for example, using a Short Message Service (SMS) or Multimedia Message Service (MMS) protocol for telephony-based instant messages or using XMPP, SIMPLE, or IMPS for Internet-based instant messages), to receive instant messages and to view received instant messages. In some embodiments, transmitted and/or received instant messages may include graphics, photos, audio files, video files and/or other attachments as are supported in a MMS and/or an Enhanced Messaging Service (EMS). As used herein, "instant messaging" refers to both telephony-based messages (e.g., messages sent using SMS or MMS) and Internet-based messages (e.g., messages sent using XMPP, SIMPLE, or IMPS).

In conjunction with RF circuitry 1008, touch screen 1012, display controller 1056, contact module 1030, graphics module 1032, text input module 1034, GPS module 1035, map module 1054, and music player module 1046, workout support module 1042 includes executable instructions to create workouts (e.g., with time, distance, and/or calorie burning goals); communicate with workout sensors (sports devices); receive workout sensor data; calibrate sensors used to monitor a workout; select and play music for a workout; and display, store and transmit workout data.

In conjunction with touch screen 1012, display controller 1056, optical sensor(s) 1064, optical sensor controller 1058, contact module 1030, graphics module 1032, and image management module 1044, camera module 1043 includes executable instructions to capture still images or video (including a video stream) and store them into memory 1002, modify characteristics of a still image or video, or delete a still image or video from memory 1002.

In conjunction with touch screen 1012, display controller 1056, contact module 1030, graphics module 1032, text input module 1034, and camera module 1043, image management module 1044 includes executable instructions to arrange, modify (e.g., edit), or otherwise manipulate, label, delete, present (e.g., in a digital slide show or album), and store still and/or video images.

In conjunction with RF circuitry 1008, touch screen 1012, display system controller 1056, contact module 1030, graphics module 1032, and text input module 1034, browser module 1047 includes executable instructions to browse the Internet in accordance with user instructions, including searching, linking to, receiving, and displaying web pages or portions thereof, as well as attachments and other files linked to web pages.

In conjunction with RF circuitry 1008, touch screen 1012, display system controller 1056, contact module 1030, graphics module 1032, text input module 1034, e-mail client module 1040, and browser module 1047, calendar module 1048 includes executable instructions to create, display, modify, and store calendars and data associated with calendars (e.g., calendar entries, to do lists, etc.) in accordance with user instructions.

In conjunction with RF circuitry 1008, touch screen 1012, display system controller 1056, contact module 1030, graphics module 1032, text input module 1034, and browser module 1047, widget modules 1049 are mini-applications that may be downloaded and used by a user (e.g., weather widget 1049-1, stocks widget 1049-2, calculator widget 10493, alarm clock widget 1049-4, and dictionary widget 1049-5) or created by the user (e.g., user-created widget 1049-6). In some embodiments, a widget includes an HTML (Hypertext Markup Language) file, a CSS (Cascading Style Sheets) file, and a JavaScript file. In some embodiments, a widget includes an XML (Extensible Markup Language) file and a JavaScript file (e.g., Yahoo! Widgets).

In conjunction with RF circuitry 1008, touch screen 1012, display system controller 1056, contact module 1030, graphics module 102, text input module 1034, and browser module 1047, the widget creator module 1050 may be used by a user to create widgets (e.g., turning a user-specified portion of a web page into a widget).

In conjunction with touch screen 1012, display system controller 1056, contact module 1030, graphics module 1032, and text input module 1034, search module 1051 includes executable instructions to search for text, music, sound, image, video, and/or other files in memory 1002 that match one or more search criteria (e.g., one or more user-specified search terms) in accordance with user instructions.

In conjunction with touch screen 1012, display system controller 1056, contact module 1030, graphics module 1032, audio circuitry 1010, speaker 1011, RF circuitry 1008, and browser module 1047, video and music player module 1052 includes executable instructions that allow the user to download and play back recorded music and other sound files stored in one or more file formats, such as MP3 or AAC files, and executable instructions to display, present or otherwise play back videos (e.g., on touch screen 1012 or on an external, connected display via external port 1024). In some embodiments, device 1000 may include the functionality of an MP3 player, such as an iPod (trademark of Apple Inc.).

In conjunction with touch screen 1012, display controller 1056, contact module 1030, graphics module 1032, and text input module 1034, notes module 1053 includes executable instructions to create and manage notes, to do lists, and the like in accordance with user instructions.

In conjunction with RF circuitry 1008, touch screen 1012, display system controller 1056, contact module 1030, graphics module 1032, text input module 1034, GPS module 1035, and browser module 1047, map module 1054 may be used to receive, display, modify, and store maps and data associated with maps (e.g., driving directions; data on stores and other points of interest at or near a particular location; and other location-based data) in accordance with user instructions.

In conjunction with touch screen 1012, display system controller 1056, contact module 1030, graphics module 1032, audio circuitry 1010, speaker 1011, RF circuitry 1008, text input module 1034, e-mail client module 1040, and browser module 1047, online video module 1055 includes instructions that allow the user to access, browse, receive (e.g., by streaming and/or download), play back (e.g., on the touch screen or on an external, connected display via external port 1024), send an e-mail with a link to a particular online video, and otherwise manage online videos in one or more file formats, such as H.264. In some embodiments, instant messaging module 1041, rather than e-mail client module 1040, is used to send a link to a particular online video.

Each of the above identified modules and applications correspond to a set of executable instructions for performing one or more functions described above and the methods described in this application (e.g., the computer-implemented methods and other information processing methods described herein). These modules (i.e., sets of instructions) need not be implemented as separate software programs, procedures or modules, and thus various subsets of these modules may be combined or otherwise re-arranged in various embodiments. In some embodiments, memory 1002 may store a subset of the modules and data structures identified above. Furthermore, memory 1002 may store additional modules and data structures not described above.

In some embodiments, device 1000 is a device where operation of a predefined set of functions on the device is performed exclusively through a touch screen and/or a touchpad. By using a touch screen and/or a touchpad as the primary input control device for operation of device 1000, the number of physical input control devices (such as push buttons, dials, and the like) on device 1000 may be reduced.

The predefined set of functions that may be performed exclusively through a touch screen and/or a touchpad include navigation between user interfaces. In some embodiments, the touchpad, when touched by the user, navigates device 1000 to a main, home, or root menu from any user interface that may be displayed on device 1000. In such embodiments, the touchpad may be referred to as a "menu button." In some other embodiments, the menu button may be a physical push button or other physical input control device instead of a touchpad.

Figure 10B:
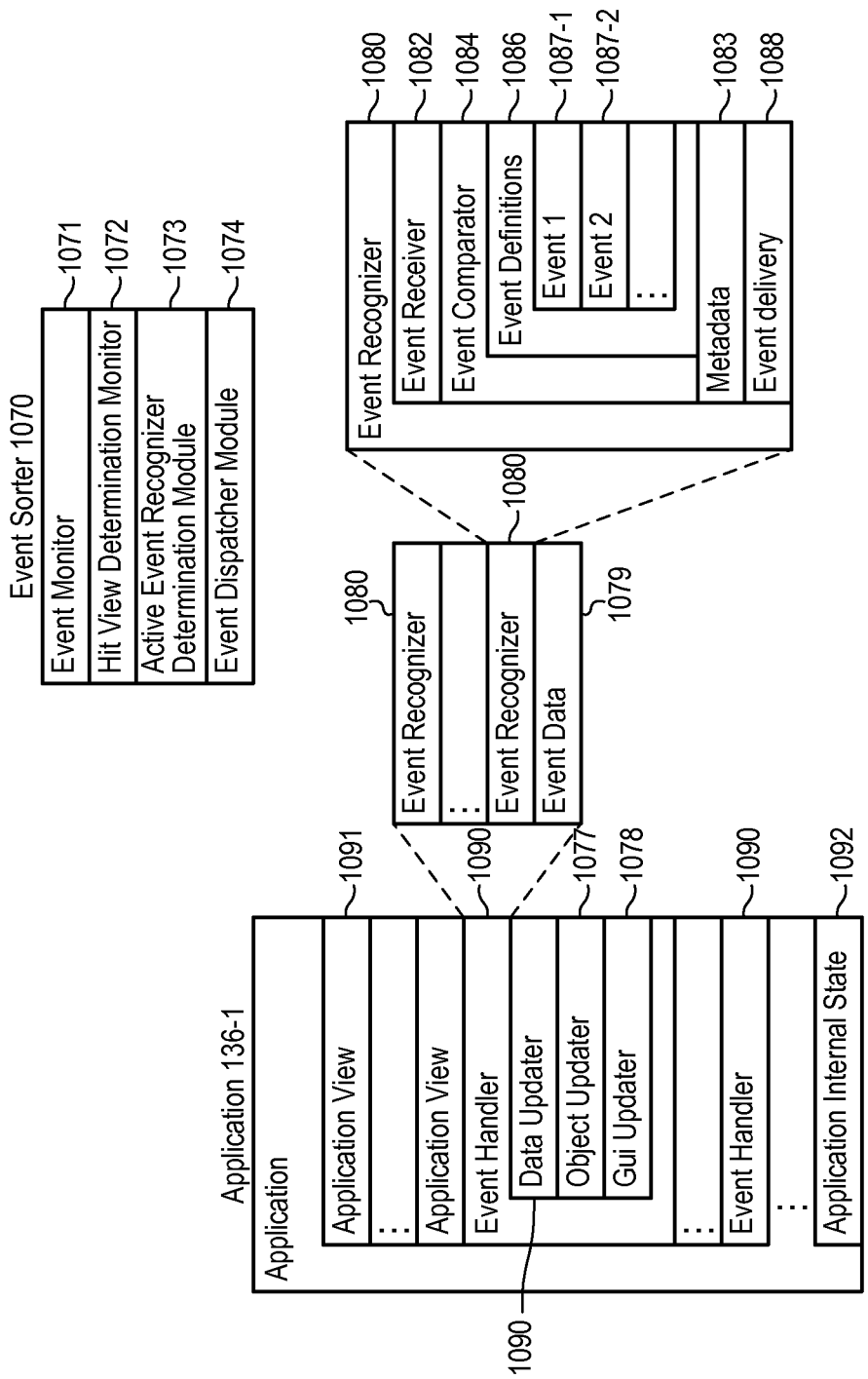

FIG. 10B is a block diagram illustrating exemplary components for event handling in accordance with some embodiments. In some embodiments, memory 1002 (in FIG. 10A) includes event sorter 1070 (e.g., in operating system 1026) and a respective application 1036-1 (e.g., any of the aforementioned applications 1037-1051, 1055).

Event sorter 1070 receives event information and determines the application 1036-1 and application view 1091 of application 1036-1 to which to deliver the event information. Event sorter 1070 includes event monitor 1071 and event dispatcher module 1074. In some embodiments, application 1036-1 includes application internal state 1092, which indicates the current application view(s) displayed on touch sensitive display 1012 when the application is active or executing. In some embodiments, device/global internal state 1057 is used by event sorter 1070 to determine which application(s) is (are) currently active, and application internal state 1092 is used by event sorter 1070 to determine application views 1091 to which to deliver event information.

In some embodiments, application internal state 1092 includes additional information, such as one or more of: resume information to be used when application 1036-1 resumes execution, user interface state information that indicates information being displayed or that is ready for display by application 1036-1, a state queue for enabling the user to go back to a prior state or view of application 1036-1, and a redo/undo queue of previous actions taken by the user.

Event monitor 1071 receives event information from peripherals interface 1018. Event information includes information about a sub-event (e.g., a user touch on touch sensitive display 1012, as part of a multi-touch gesture). Peripherals interface 1018 transmits information it receives from I/O subsystem 1006 or a sensor, such as proximity sensor 1066, orientation sensor(s) 1068, and/or microphone 1013 (through audio circuitry 1010). Information that peripherals interface 1018 receives from I/O subsystem 1006 includes information from touch-sensitive display 1012 or a touch-sensitive surface.

In some embodiments, event monitor 1071 sends requests to the peripherals interface 1018 at predetermined intervals. In response, peripherals interface 1018 transmits event information. In other embodiments, peripheral interface 1018 transmits event information only when there is a significant event (e.g., receiving an input above a predetermined noise threshold and/or for more than a predetermined duration).

In some embodiments, event sorter 1070 also includes a hit view determination module 1072 and/or an active event recognizer determination module 1073.

Hit view determination module 1072 provides software procedures for determining where a sub-event has taken place within one or more views, when touch sensitive display 1012 displays more than one view. Views are made up of controls and other elements that a user can see on the display.

Another aspect of the user interface associated with an application is a set of views, sometimes herein called application views or user interface windows, in which information is displayed and touch-based gestures occur. The application views (of a respective application) in which a touch is detected may correspond to programmatic levels within a programmatic or view hierarchy of the application. For example, the lowest level view in which a touch is detected may be called the hit view, and the set of events that are recognized as proper inputs may be determined based, at least in part, on the hit view of the initial touch that begins a touch-based gesture.

Hit view determination module 1072 receives information related to sub-events of a touch-based gesture. When an application has multiple views organized in a hierarchy, hit view determination module 1072 identifies a hit view as the lowest view in the hierarchy which should handle the sub-event. In most circumstances, the hit view is the lowest level view in which an initiating sub-event occurs (i.e., the first sub-event in the sequence of sub-events that form an event or potential event). Once the hit view is identified by the hit view determination module, the hit view typically receives all sub-events related to the same touch or input source for which it was identified as the hit view.

Active event recognizer determination module 1073 determines which view or views within a view hierarchy should receive a particular sequence of sub-events. In some embodiments, active event recognizer determination module 1073 determines that only the hit view should receive a particular sequence of sub-events. In other embodiments, active event recognizer determination module 1073 determines that all views that include the physical location of a sub-event are actively involved views, and therefore determines that all actively involved views should receive a particular sequence of sub-events. In other embodiments, even if touch sub-events were entirely confined to the area associated with one particular view, views higher in the hierarchy would still remain as actively involved views.

Event dispatcher module 1074 dispatches the event information to an event recognizer (e.g., event recognizer 1080). In embodiments including active event recognizer determination module 1073, event dispatcher module 1074 delivers the event information to an event recognizer determined by active event recognizer determination module 1073. In some embodiments, event dispatcher module 1074 stores in an event queue the event information, which is retrieved by a respective event receiver module 1082.

In some embodiments, operating system 1026 includes event sorter 1070. Alternatively, application 1036-1 includes event sorter 1070. In yet other embodiments, event sorter 1070 is a stand-alone module, or a part of another module stored in memory 1002, such as contact/motion module 1030.

In some embodiments, application 1036-1 includes multiple event handlers 1090 and one or more application views 1091, each of which includes instructions for handling touch events that occur within a respective view of the application's user interface. Each application view 1091 of the application 1036-1 includes one or more event recognizers 1080. Typically, a respective application view 1091 includes multiple event recognizers 1080. In other embodiments, one or more of event recognizers 1080 are part of a separate module, such as a user interface kit (not shown) or a higher level object from which application 1036-1 inherits methods and other properties. In some embodiments, a respective event handler 1090 includes one or more of: data updater 1076, object updater 1077, GUI updater 1078, and/or event data 1079 received from event sorter 1070. Event handler 1090 may utilize or call data updater 1076, object updater 1077 or GUI updater 1078 to update the application internal state 1092. Alternatively, one or more of the application views 1091 includes one or more respective event handlers 1090. Also, in some embodiments, one or more of data updater 1076, object updater 1077, and GUI updater 1078 are included in a respective application view 1091.

A respective event recognizer 1080 receives event information (e.g., event data 1079) from event sorter 1070, and identifies an event from the event information. Event recognizer 1080 includes event receiver 1082 and event comparator 1084. In some embodiments, event recognizer 1080 also includes at least a subset of: metadata 1083, and event delivery instructions 1088 (which may include sub-event delivery instructions).

Event receiver 1082 receives event information from event sorter 1070. The event information includes information about a sub-event, for example, a touch or a touch movement. Depending on the sub-event, the event information also includes additional information, such as location of the sub-event. When the sub-event concerns motion of a touch the event information may also include speed and direction of the sub-event. In some embodiments, events include rotation of the device from one orientation to another (e.g., from a portrait orientation to a landscape orientation, or vice versa), and the event information includes corresponding information about the current orientation (also called device attitude) of the device.

Event comparator 1084 compares the event information to predefined event or sub-event definitions and, based on the comparison, determines an event or sub-event, or determines or updates the state of an event or sub-event. In some embodiments, event comparator 1084 includes event definitions 1086. Event definitions 1086 contain definitions of events (e.g., predefined sequences of sub-events), for example, event 1 (1087-1), event 2 (1087-2), and others. In some embodiments, sub-events in an event 1087 include, for example, touch begin, touch end, touch movement, touch cancellation, and multiple touching. In one example, the definition for event 1 (1087-1) is a double tap on a displayed object. The double tap, for example, includes a first touch (touch begin) on the displayed object for a predetermined phase, a first lift-off (touch end) for a predetermined phase, a second touch (touch begin) on the displayed object for a predetermined phase, and a second lift-off (touch end) for a predetermined phase. In another example, the definition for event 2 (1087-2) is a dragging on a displayed object. The dragging, for example, includes a touch (or contact) on the displayed object for a predetermined phase, a movement of the touch across touch-sensitive display 1012, and lift-off of the touch (touch end). In some embodiments, the event also includes information for one or more associated event handlers 1090.

In some embodiments, event definition 1087 includes a definition of an event for a respective user-interface object. In some embodiments, event comparator 1084 performs a hit test to determine which user-interface object is associated with a sub-event. For example, in an application view in which three user-interface objects are displayed on touch-sensitive display 1012, when a touch is detected on touch-sensitive display 1012, event comparator 1084 performs a hit test to determine which of the three user-interface objects is associated with the touch (sub-event). If each displayed object is associated with a respective event handler 1090, the event comparator uses the result of the hit test to determine which event handler 1090 should be activated. For example, event comparator 1084 selects an event handler associated with the sub-event and the object triggering the hit test.

In some embodiments, the definition for a respective event 1087 also includes delayed actions that delay delivery of the event information until after it has been determined whether the sequence of sub-events does or does not correspond to the event recognizer's event type.

When a respective event recognizer 1080 determines that the series of sub-events do not match any of the events in event definitions 1086, the respective event recognizer 1080 enters an event impossible, event failed, or event ended state, after which it disregards subsequent sub-events of the touch-based gesture. In this situation, other event recognizers, if any, that remain active for the hit view continue to track and process sub-events of an ongoing touch-based gesture.

In some embodiments, a respective event recognizer 1080 includes metadata 1083 with configurable properties, flags, and/or lists that indicate how the event delivery system should perform sub-event delivery to actively involved event recognizers. In some embodiments, metadata 1083 includes configurable properties, flags, and/or lists that indicate how event recognizers may interact with one another. In some embodiments, metadata 1083 includes configurable properties, flags, and/or lists that indicate whether sub-events are delivered to varying levels in the view or programmatic hierarchy.

In some embodiments, a respective event recognizer 1080 activates event handler 1090 associated with an event when one or more particular sub-events of an event are recognized. In some embodiments, a respective event recognizer 1080 delivers event information associated with the event to event handler 190. Activating an event handler 1090 is distinct from sending (and deferred sending) sub-events to a respective hit view. In some embodiments, event recognizer 1080 throws a flag associated with the recognized event, and event handler 1090 associated with the flag catches the flag and performs a predefined process.

In some embodiments, event delivery instructions 1088 include sub-event delivery instructions that deliver event information about a sub-event without activating an event handler. Instead, the sub-event delivery instructions deliver event information to event handlers associated with the series of sub-events or to actively involved views. Event handlers associated with the series of sub-events or with actively involved views receive the event information and perform a predetermined process.

In some embodiments, data updater 1076 creates and updates data used in application 1036-1. For example, data updater 1076 updates the telephone number used in contacts module 1037, or stores a video file used in video player module 1045. In some embodiments, object updater 1077 creates and updates objects used in application 1036-1. For example, object updater 1076 creates a new user-interface object or updates the position of a user-interface object. GUI updater 1078 updates the GUI. For example, GUI updater 1078 prepares display information and sends it to graphics module 1032 for display on a touch-sensitive display.

In some embodiments, event handler(s) 1090 includes or has access to data updater 1076, object updater 1077, and GUI updater 1078. In some embodiments, data updater 1076, object updater 1077, and GUI updater 1078 are included in a single module of a respective application 1036-1 or application view 1091. In other embodiments, they are included in two or more software modules.

It shall be understood that the foregoing discussion regarding event handling of user touches on touch-sensitive displays also applies to other forms of user inputs to operate multifunction devices 1000 with input-devices, not all of which are initiated on touch screens, e.g., coordinating mouse movement and mouse button presses with or without single or multiple keyboard presses or holds, user movements taps, drags, scrolls, etc., on touch-pads, pen stylus inputs, movement of the device, oral instructions, detected eye movements, biometric inputs, and/or any combination thereof, which may be utilized as inputs corresponding to sub-events which define an event to be recognized.

Figure 11:
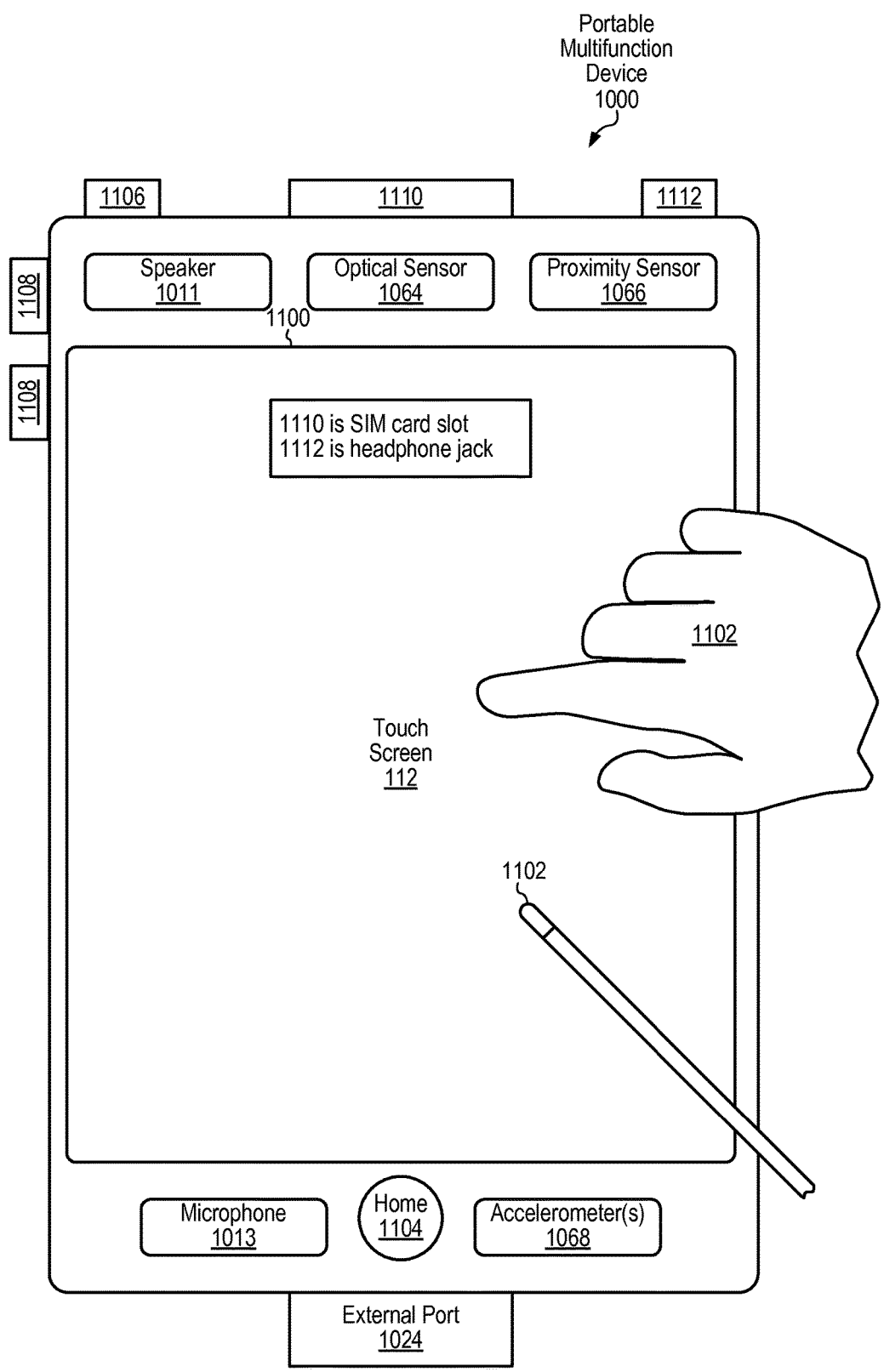
FIG. 11 illustrate an example multifunction device in accordance with some embodiments.

FIG. 11 illustrates a portable multifunction device 1000 having a touch screen 1012 in accordance with some embodiments. The touch screen may display one or more graphics within user interface (UI) 1100. In this embodiment, as well as others described below, a user may select one or more of the graphics by making a gesture on the graphics, for example, with one or more fingers 1102 (not drawn to scale in the figure) or one or more styluses 1103 (not drawn to scale in the figure). In some embodiments, selection of one or more graphics occurs when the user breaks contact with the one or more graphics. In some embodiments, the gesture may include one or more taps, one or more swipes (from left to right, right to left, upward and/or downward) and/or a rolling of a finger (from right to left, left to right, upward and/or downward) that has made contact with device 1000. In some embodiments, inadvertent contact with a graphic may not select the graphic. For example, a swipe gesture that sweeps over an application icon may not select the corresponding application when the gesture corresponding to selection is a tap.

Device 1000 may also include one or more physical buttons, such as "home" or menu button 1104. As described previously, menu button 1104 may be used to navigate to any application 1036 in a set of applications that may be executed on device 1000. Alternatively, in some embodiments, the menu button is implemented as a soft key in a GUI displayed on touch screen 1012.

In one embodiment, device 1000 includes touch screen 1112, menu button 1104, push button 1106 for powering the device on/off and locking the device, volume adjustment button(s) 1108, Subscriber Identity Module (SIM) card slot 1110, head set jack 1112, and docking/charging external port 1024. Push button 1106 may be used to turn the power on/off on the device by depressing the button and holding the button in the depressed state for a predefined time interval; to lock the device by depressing the button and releasing the button before the predefined time interval has elapsed; and/or to unlock the device or initiate an unlock process. In an alternative embodiment, device 1000 also may accept verbal input for activation or deactivation of some functions through microphone 1013.

It should be noted that, although many of the following examples will be given with reference to inputs on touch screen 1012 (where the touch sensitive surface and the display are combined), a touch-sensitive surface that is separate from the display may be used instead of touch screen 1012.

Example Computer System

Various embodiments of the system and method for tile-based reduction of access point location information, as described herein, may be executed on one or more computer systems, which may interact with various other devices. Note that any component, action, or functionality described above with respect to FIGS. 1-11 and 13 (described below) may be implemented on one or more computers configured as computer system 1200 of FIG. 12, according to various embodiments. In the illustrated embodiment, computer system 1200 includes one or more processors 1210 coupled to a system memory 1220 via an input/output (I/O) interface 1230. Computer system 1200 further includes a network interface 1240 coupled to I/O interface 1230, and one or more input/output devices 1250, such as cursor control device 1260, keyboard 1270, and display(s) 1280. In some cases, it is contemplated that embodiments may be implemented using a single instance of computer system 1200, while in other embodiments multiple such systems, or multiple nodes making up computer system 1200, may be configured to host different portions or instances of embodiments. For example, in one embodiment some elements may be implemented via one or more nodes of computer system 1200 that are distinct from those nodes implementing other elements.

In various embodiments, computer system 1200 may be a uniprocessor system including one processor 1210, or a multiprocessor system including several processors 1210 (e.g., two, four, eight, or another suitable number). Processors 1210 may be any suitable processor capable of executing instructions. For example, in various embodiments processors 1210 may be general-purpose or embedded processors implementing any of a variety of instruction set architectures (ISAs), such as the x86, PowerPC, SPARC, or MIPS ISAs, or any other suitable ISA. In multiprocessor systems, each of processors 1210 may commonly, but not necessarily, implement the same ISA.

System memory 1220 may be configured to store program instructions 1222 and/or data 1232 accessible by processor 1210. In various embodiments, system memory 1220 may be implemented using any suitable memory technology, such as static random access memory (SRAM), synchronous dynamic RAM (SDRAM), nonvolatile/Flash-type memory, or any other type of memory. In the illustrated embodiment, program instructions 1222 may be configured to implement a mapping application 1224 incorporating any of the functionality described above. Additionally, data 1232 of memory 1220 may include mapping information 1234 including any of the information or data structures described above, including but not limited to mapping information for rendering map instances, position information indicating past or current positions of the user, and/or route information for navigating from an origination to a destination. In some embodiments, program instructions and/or data may be received, sent or stored upon different types of computer-accessible media or on similar media separate from system memory 1220 or computer system 1200. While computer system 1200 is described as implementing the functionality of functional blocks of previous Figures, any of the functionality described herein may be implemented via such a computer system.

In one embodiment, I/O interface 1230 may be configured to coordinate I/O traffic between processor 1210, system memory 1220, and any peripheral devices in the device, including network interface 1240 or other peripheral interfaces, such as input/output devices 1250. In some embodiments, I/O interface 1230 may perform any necessary protocol, timing or other data transformations to convert data signals from one component (e.g., system memory 1220) into a format suitable for use by another component (e.g., processor 1210). In some embodiments, I/O interface 1230 may include support for devices attached through various types of peripheral buses, such as a variant of the Peripheral Component Interconnect (PCI) bus standard or the Universal Serial Bus (USB) standard, for example. In some embodiments, the function of I/O interface 1230 may be split into two or more separate components, such as a north bridge and a south bridge, for example. Also, in some embodiments some or all of the functionality of I/O interface 1230, such as an interface to system memory 1220, may be incorporated directly into processor 1210.

Network interface 1240 may be configured to allow data to be exchanged between computer system 1200 and other devices attached to a network 1285 (e.g., carrier or agent devices) or between nodes of computer system 1200. Network 1285 may in various embodiments include one or more networks including but not limited to Local Area Networks (LANs) (e.g., an Ethernet or corporate network), Wide Area Networks (WANs) (e.g., the Internet), wireless data networks, some other electronic data network, or some combination thereof. In various embodiments, network interface 1240 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 1250 may, in some embodiments, include one or more display terminals, keyboards, keypads, touchpads, scanning devices, voice or optical recognition devices, or any other devices suitable for entering or accessing data by one or more computer systems 1200. Multiple input/output devices 1250 may be present in computer system 1200 or may be distributed on various nodes of computer system 1200. In some embodiments, similar input/output devices may be separate from computer system 1200 and may interact with one or more nodes of computer system 1200 through a wired or wireless connection, such as over network interface 1240.

Figure 12:
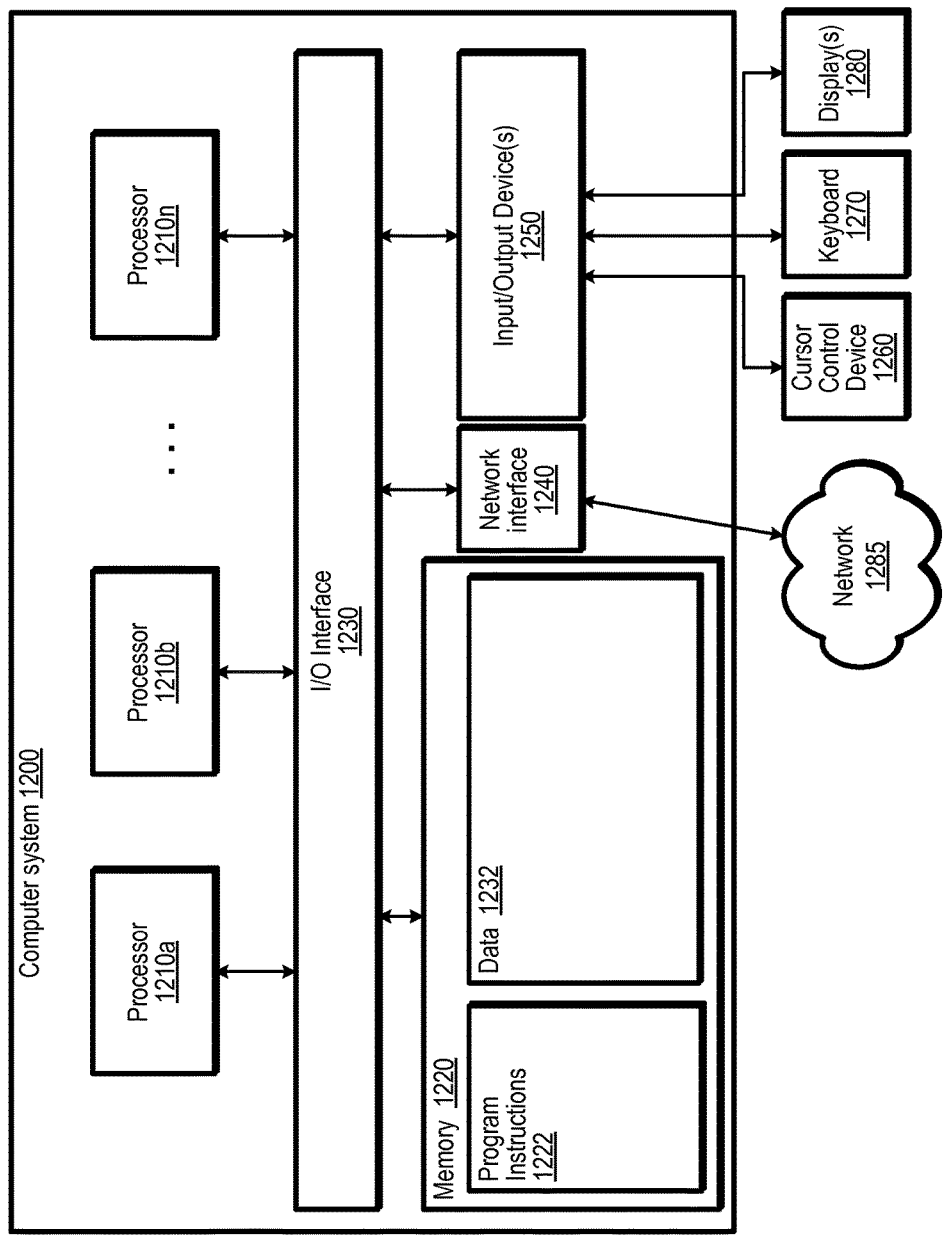
FIG. 12 illustrates an example computer system configured to implement aspects of the system and method for tile-based reduction of access point location information.

As shown in FIG. 12, memory 1220 may include program instructions 1222, which may be processor-executable to implement any element or action described above. In one embodiment, the program instructions may implement the methods described above. In other embodiments, different elements and data may be included. Note that data 1232 may include any data or information described above.

Those skilled in the art will appreciate that computer system 1200 is merely illustrative and is not intended to limit the scope of embodiments. In particular, the computer system and devices may include any combination of hardware or software that can perform the indicated functions, including computers, network devices, Internet appliances, PDAs, wireless phones, pagers, etc. Computer system 1200 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 1200 may be transmitted to computer system 1200 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium. Generally speaking, a computer-accessible medium may include a computer-readable storage medium or memory medium such as magnetic or optical media, e.g., disk or DVD/CD-ROM, volatile or non-volatile media such as RAM (e.g. SDRAM, DDR, RDRAM, SRAM, etc.), ROM, etc. In some embodiments, a computer-accessible medium may include transmission media or signals such as electrical, electromagnetic, or digital signals, conveyed via a communication medium such as network and/or a wireless link.

Figure 13:
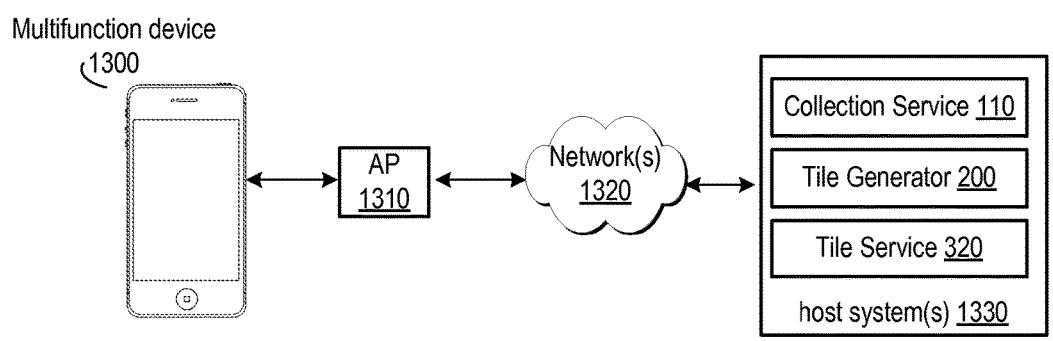
FIG. 13 illustrates example host systems configured to implement a collection service, tile generator and tile service in accordance with some embodiments.

As illustrated in FIG. 13, one or more computers (e.g., computer system 1200) may be configured to implement the functional components described herein including but not limited to collection service 110, tile generator 200, and tile service 320. For instance, one or more host systems 1330 may each represent one or more computer systems 1200. One or more multifunction devices 1300 may be configured to communicate with host systems 1330 via one or more electronic networks 1320, such as the Internet or any other network described above with respect to network 1285. In various embodiments, multifunction devices may access a network through one or more access points, illustrated as AP 1310. In various embodiments, AP 1310 (e.g., an IEEE 802.11g wireless access point) can provide communication access to one or more of networks 1320. In some embodiments, data communications can be established over network 1320 and access point 1310. For example, multifunction device 1300 can send and receive e-mail messages (e.g., using Simple Mail Transfer Protocol (SMTP) or Post Office Protocol 3 (POP3)), and retrieve electronic documents and/or streams, such as web pages, photographs, and videos, over network 1320 and AP 1310 (e.g., using Transmission Control Protocol/Internet Protocol (TCP/IP) or User Datagram Protocol (UDP)). In various embodiments, any of the multifunction devices may communicate with the services hosted by host systems 1330 using a persistent connection established in accordance with one or more security protocols, such as the Secure Sockets Layer (SSL) protocol or the Transport Layer Security (TLS) protocol.

Various modifications and changes may be made as would be obvious to a person skilled in the art having the benefit of this disclosure. The various embodiments described herein are meant to be illustrative and not limiting. Many variations, modifications, additions, and improvements are possible. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the exemplary configurations may be implemented as a combined structure or component. These and other variations, modifications, additions, and improvements may fall within the scope of embodiments as defined in the claims that follow.

What is claimed is:
1. A method comprising:
receiving network access point information for a plurality of network access points located in a region, wherein the network access point information comprises location information for each network access point of the plurality of network access points;
parsing the region into multiple tiles and for at least one of the multiple tiles into a plurality of sub-tiles;
assigning respective sub-sets of the network access points to respective buckets, wherein each of the respective buckets corresponds to one or more sub-tiles of a respective one of the multiple tiles;
decimating at least a portion of the network access point information assigned to the respective buckets, wherein decimating the at least a portion of the network access point information comprises:
for each bucket:
ranking the network access points assigned to that bucket, and
eliminating network access point information for some network access points assigned to that bucket, based at least in part on the ranking, to generate reduced network access point information for that bucket; and quantizing the reduced network access point information for each bucket, wherein quantizing the reduced network access point information comprises:
    designating a common location for a sub-tile corresponding to a respective bucket;
    reassigning multiple network access points residing within different locations of the sub-tile to the common location; and
    further reducing the reduced network access point information for the respective bucket by including the common location for the multiple network access points instead of different location information for the multiple network access points.

2. The method of claim 1, wherein the method comprises, subsequent to decimating at least some access point information from the respective buckets and quantitating access point information of the respective buckets, evaluating the access point information of the respective buckets to determine a location of an access point having a specific identifier.

3. The method of claim 1, wherein
    said reassigning comprises reassigning all access points that corresponds with the sub-tile to the common location.

4. The method of claim 1, wherein network access points that are accessed by client devices more frequently are ranked higher than network access points that are accessed by client devices less frequently.

5. The method of claim 1, wherein the method comprises generating multiple files each associated with different tiles of said multiple tiles, wherein each file comprises an index for locating location information for specific network access points within the file.

6. The method of claim 1, wherein one or more of the network access points are Wi-Fi access points.

7. A mobile device, comprising:
    a memory; and
    one or more processors coupled to the memory, wherein the memory comprises program instructions executable by the one or more processors to implement a location component configured to:
        detect a plurality of network access points including at least a first network access point in a first geographic location and a second network access point in a second geographic location;
        generate a request for one or more tiles including access point information specifying geographic locations of the detected network access points;
        receive information specifying the one or more tiles, wherein access point information for the one or more tiles has been reduced via decimation and further reduced via quantization, wherein the quantized access point information for the one or more tiles includes a common location for multiple network access points instead of different location information for the multiple network access points; and
        utilize the first detected network access point or the second detected network access point and the access point information of the one or more tiles to determine a geographic location of the mobile device
        wherein the location component determines a same geographic location of the mobile device when either the first detected network access point or the second detected network access point is utilized to determine the geographic location of the mobile device, wherein the first network access point and the second network access point are physically located in different geographic locations.

8. The mobile device of claim 7, wherein the information specifying the one or more tiles includes one or more tile files, wherein the location component is configured to generate a database of tiles within the memory based on the files.

9. The mobile device of claim 8, wherein the location component is configured to locate within the generated database an entry for the first or second detected network access point.

10. The mobile device of claim 7, wherein the location component is configured to generate the request in response to determining that a tile containing location information for the first or second detected network access point does not already reside within said memory.

11. A system, comprising:
    one or more memories; and
    one or more processors coupled to the one or more memories, wherein the one or more memories comprise program instructions executable by the one or more processors to implement a tile generator configured to reduce information describing a set of network access points and respective locations to generate a reduced information set, wherein the access points are located in a region, wherein to perform the reduction the tile generator is configured to:
        parse the region into multiple tiles and for at least one of the multiple tiles into a plurality of sub-tiles;
        assign respective sub-sets of the network access points to respective buckets, wherein each of the respective buckets corresponds to one or more sub-tiles of one of the multiple tiles; and
        decimate at least a portion of the network access point information assigned to the respective buckets, wherein to decimate the at least a portion of the network access point information the tile generator is configured to:
            for each bucket:
                based on a ranking of the network access points in that bucket, eliminate network access point information for some network access points assigned to that bucket to generate the reduced network access point information for that bucket; and
                store the reduced network access point information for that bucket; and
        quantize the reduced network access point information for the respective buckets, wherein to quantize the reduced network access point information the tile generator is configured to:
            designate a common location for a sub-tile corresponding to a respective bucket;
            reassign multiple network access points residing within different locations of the sub-tile to the common location; and
            further reduce the reduced network access point information for the respective bucket by including the common location for the multiple network access points instead of different location information for the multiple network access points.

12. The system of claim 11, wherein the tile generator is configured to generate a file for each tile, wherein each file comprises an index for expedited searching of multiple location entries for network access points.

13. The system of claim 11, wherein network access points that are accessed by client devices more frequently are ranked higher than network access points that are accessed by client devices less frequently.

14. The system of claim 13, wherein the tile generator is configured to generate said ranking based on historical access point location information received from multiple client devices.

15. A method, comprising:
   detecting, by a mobile device, an identifier of a first network access point in a first geographic location and an identifier of a second network access point in a second geographic location;
   generating a request for one or more tiles including information specifying the identifier of the first network access point and a corresponding geographic location and the identifier of the second network access point and a corresponding geographic location;
   receiving information specifying the one or more tiles, wherein access point information for the one or more tiles has been reduced via decimation and further reduced via quantization, wherein the quantized access point information for the one or more tiles includes a common location for multiple network access points instead of different location information for the multiple network access points; and
   utilizing the first detected network access point identifier or the second detected network access point identifier and the access point information of the one or more tiles to determine a geographic location of the mobile device,
   wherein a same geographic location of the mobile device is determined when either the first detected network access point or the second detected network access point is utilized to determine the geographic location of the mobile device, wherein the first network access point and the second network access point are physically located in different geographic locations.

16. The method of claim 15, wherein the method comprises storing the one or more tiles in a local cache.

17. The method of claim 15, wherein the method comprises:
   detecting an identifier of an additional network access point; and
   in response to determining that an entry for the additional network access point is not in the cache, generating a request to obtain a tile comprising location information for the additional network access point.

18. The method of claim 15, wherein the method comprises:
   detecting an identifier of an additional network access point; and
   in response to determining that the cache contains a location entry for the additional network access point, determine the location of the additional network access point based on that location entry.

19. The method of claim 15, wherein the information specifying the one or more tiles includes an index into a list of location entries for multiple access points, wherein the method further comprises evaluating the index to locate a sub-portion of the list that contains an entry for the first network access point.

20. A non-transitory computer-readable storage medium, storing program instructions computer-executable on a computer to implement a tile generator configured to generate a reduced information set, wherein to perform the reduction the tile generator is configured to:
   receive network access point information for a plurality of network access points located in a region, wherein the network access point information comprises location information for each network access point of the plurality of network access points;
   parse the region into multiple tiles and for at least one of the multiple tiles into a plurality of sub-tiles;
   assign respective sub-sets of the network access points to respective buckets, wherein each of the respective buckets corresponds to one or more sub-tiles of one of the multiple tiles;
   decimate at least a portion of the network access point information assigned to the respective buckets, wherein to decimate the at least a portion of the network access point information the tile generator is configured to:
      for each bucket:
         based on a ranking of the network access points assigned to that bucket, eliminate network access point information for some network access points assigned to that bucket to generate the reduced network access point information for that bucket; and
   quantize the reduced network access point information for the respective buckets, wherein to quantize the reduced network access point information the tile generator is configured to:
      for each bucket:
         designate a common location for a sub-tile corresponding to that bucket;
         reassign multiple network access points residing within different locations of the sub-tile to the common location; and
         further reduce the reduced network access point information for that bucket by including the common location for the multiple network access points instead of different location information for the multiple network access points in the further reduced network access point information for that bucket.

21. The non-transitory medium of claim 20, wherein the tile generator is configured to generate a file for each tile, wherein each file comprises an index for expedited searching of multiple location entries for network access points.

22. The non-transitory medium of claim 20, wherein network access points that are accessed by client devices more frequently are ranked higher than network access points that are accessed by client devices less frequently.

23. The non-transitory medium of claim 22, wherein the tile generator is configured to generate said ranking based on historical access point location information received from multiple client devices.

* * * * *